United States Patent
Park

(10) Patent No.: US 11,024,587 B2
(45) Date of Patent: Jun. 1, 2021

(54) SELF-DESTRUCTIBLE APPARATUS AND METHOD AND SEMICONDUCTOR CHIP USING THE SAME

(71) Applicant: ELECTRONICS AND TELECOMMUNICATIONS RESEARCH INSTITUTE, Daejeon (KR)

(72) Inventor: Seong Cheon Park, Seongnam (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/765,122

(22) PCT Filed: Nov. 23, 2018

(86) PCT No.: PCT/KR2018/014486
§ 371 (c)(1),
(2) Date: May 18, 2020

(87) PCT Pub. No.: WO2019/103508
PCT Pub. Date: May 31, 2019

(65) Prior Publication Data
US 2020/0350264 A1    Nov. 5, 2020

(30) Foreign Application Priority Data

Nov. 24, 2017  (KR) .......................... 10-2017-0157936
Nov. 21, 2018  (KR) .......................... 10-2018-0144591

(51) Int. Cl.
*H01L 23/00* (2006.01)
*G06F 21/75* (2013.01)
*H01L 23/522* (2006.01)

(52) U.S. Cl.
CPC ............ *H01L 23/576* (2013.01); *G06F 21/75* (2013.01); *H01L 23/5226* (2013.01)

(58) Field of Classification Search
CPC .... G06F 21/75; H01L 23/576; H01L 23/5226
See application file for complete search history.

(56) References Cited

U.S. PATENT DOCUMENTS

| 2009/0070887 A1 | 3/2009 | Knowles et al. |
| 2009/0132624 A1* | 5/2009 | Haselsteiner ........... G06F 7/588 708/255 |

(Continued)

FOREIGN PATENT DOCUMENTS

| KR | 20090056908 A | 6/2009 |
| KR | 20140099934 A | 8/2014 |
| KR | 20160056269 A | 5/2016 |

*Primary Examiner* — Kurtis R Bahr

(57) ABSTRACT

The present invention relates to a self-destructible apparatus and method. The apparatus includes a self-destructible operation unit composed of a plurality of cavity cells; a variable voltage/current supply unit configured to supply a variable voltage and current to the self-destructible operation unit; an identification (ID) matching unit configured to compare an ID input from an external source to a digital physical unclonable function (PUF) ID assigned to each of the cavity cells to determine whether the two IDs match each other so that power of the variable voltage/current supply unit is supplied to only a desired cavity cell among the plurality of cavity cells; a digital PUF ID generation unit configured to generate the digital PUF ID input to the ID matching unit; and an external ID input unit configured to generate the ID input to the ID matching unit.

42 Claims, 26 Drawing Sheets

(56) References Cited

U.S. PATENT DOCUMENTS

| | | | |
|---|---|---|---|
| 2009/0143048 A1 | 6/2009 | Ayanamcottil et al. | |
| 2013/0140649 A1 | 6/2013 | Rogers et al. | |
| 2014/0108786 A1* | 4/2014 | Kreft | G06F 21/335 713/156 |
| 2015/0169893 A1* | 6/2015 | Desai | H04W 12/082 726/1 |
| 2016/0065379 A1* | 3/2016 | Holcomb | G09C 1/00 713/189 |
| 2016/0132296 A1 | 5/2016 | Park | |
| 2017/0025365 A1* | 1/2017 | Tin | B29C 35/02 |
| 2018/0294981 A1* | 10/2018 | Willers | G06F 21/72 |
| 2019/0012487 A1* | 1/2019 | Choi | H04L 29/06 |

* cited by examiner

SIDE VIEW

TOP VIEW

SELF-DESTRUCTIBLE APPARATUS AND METHOD AND SEMICONDUCTOR CHIP USING THE SAME

BACKGROUND

1. Field of the Invention

The present invention relates to a self-destructible apparatus and method that are identified and operated using a digital physical unclonable function (PUF) ID, and more particularly, to a self-destructible apparatus and method disposed in a semiconductor chip or a semiconductor chip built-in circuit and capable of self-burnout, breakdown, destruction, or explosion through the digital PUF ID.

2. Discussion of Related Art

A device such as cell phones, external or embedded semiconductor memory devices, digital cameras, military drones, autonomous vehicles, and artificial intelligence systems has built-in system semiconductors and memory semiconductors.

However, due to insufficient security for important data stored in the memory semiconductor of the devices and insufficient security of the system semiconductor responsible for a control function of the devices, the important data and the control function embedded in the semiconductor are exposed to others when the device is lost, seized, or robbed, thereby causing serious damage.

Meanwhile, in order to secure the data and the main control function embedded in the semiconductor, the data is encrypted and stored, or a cryptographic technique such as user authentication and access control is used to allow only an authorized user to access the data.

However, when hacking techniques or duplication techniques such as a power analysis attack, a reverse design, or the like are used, there is a limitation on information security technology that can extract the data or function embedded in the device.

SUMMARY OF THE INVENTION

The present invention has been made in view of the above circumstances and is directed to providing a self-destructible apparatus and method having a semiconductor chip into which a function capable of self-burnout, destruction, or explosion is embedded as an ultimate security measure for data or functionality embedded therein such that the semiconductor chip is burned out, destroyed, or exploded by itself when a device equipped with the semiconductor chip is put under specific undesired conditions or when the device receives a wireless control signal from a remote site.

The present invention is also directed to providing a self-destructible apparatus and method capable of manufacturing a system-on-chip (SoC) for an electronic detonator that has a digital physical unclonable function (PUF) identification (ID) embedded in a semiconductor and that selectively identifies only a semiconductor chip intended to be burn out, destroyed, or exploded without malfunction so as to make only the semiconductor chip ignite and explode.

According to an embodiment of the present invention, a self-destructible apparatus-comprises a self-destructible operation unit comprising a plurality of cavity cells; a variable voltage/current supply unit configured to supply a variable voltage and current to the self-destructible operation unit; an identification (ID) matching unit configured to compare an ID input from an external source to a digital physical unclonable function (PUF) ID assigned to each of the cavity cells to determine whether the two IDs match each other so that power of the variable voltage/current supply unit is supplied to only a desired cavity cell among the plurality of cavity cells of the self-destructible operation unit; a digital PUF ID generation unit configured to generate the digital PUF ID input to the ID matching unit; and an external ID input unit configured to generate the ID input to the ID matching unit.

DETAILED DESCRIPTION OF THE EXEMPLARY EMBODIMENTS

Advantages and features of the present invention and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. The present invention is defined by the appended claims. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings.

Figure 1:
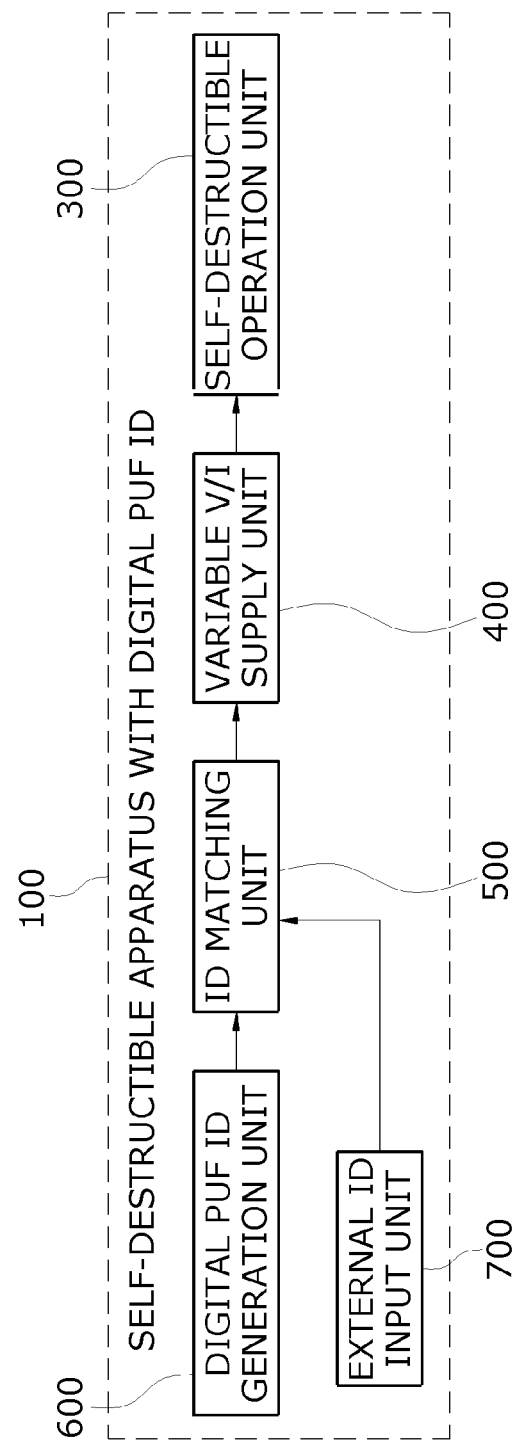
FIG. 1 is a block diagram showing a self-destructible apparatus according to the present invention.
Figure 2:
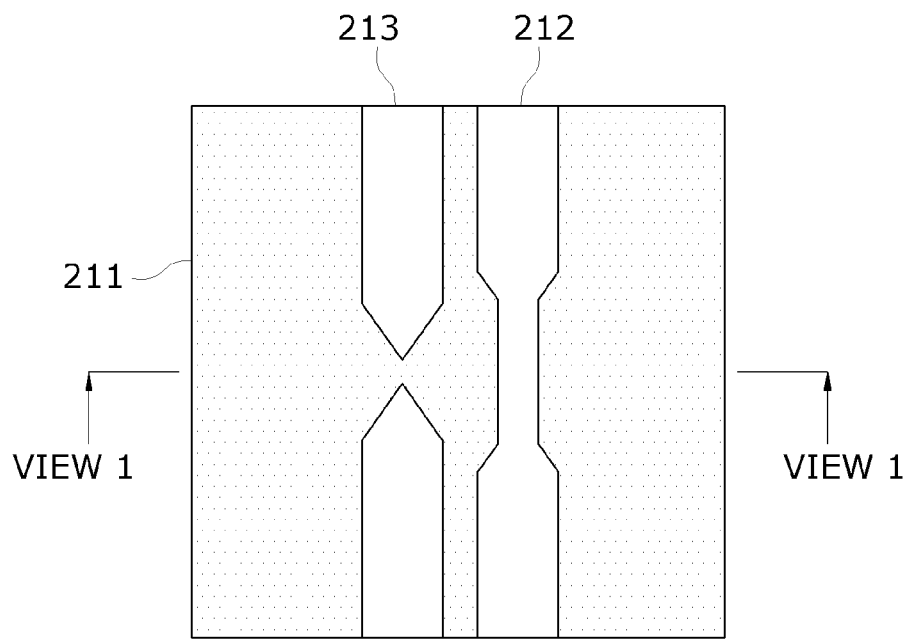
FIGS. 2 to 19 are views showing an embodiment of a self-destructible operation unit of the self-destructible apparatus according to the present invention.
Figure 3:
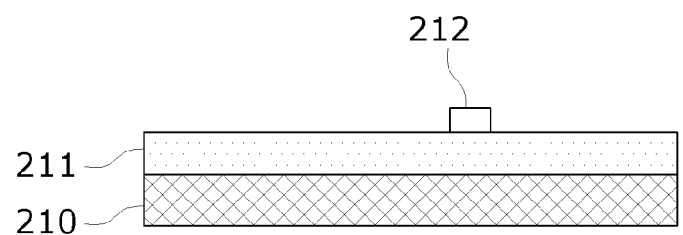
Figure 4:
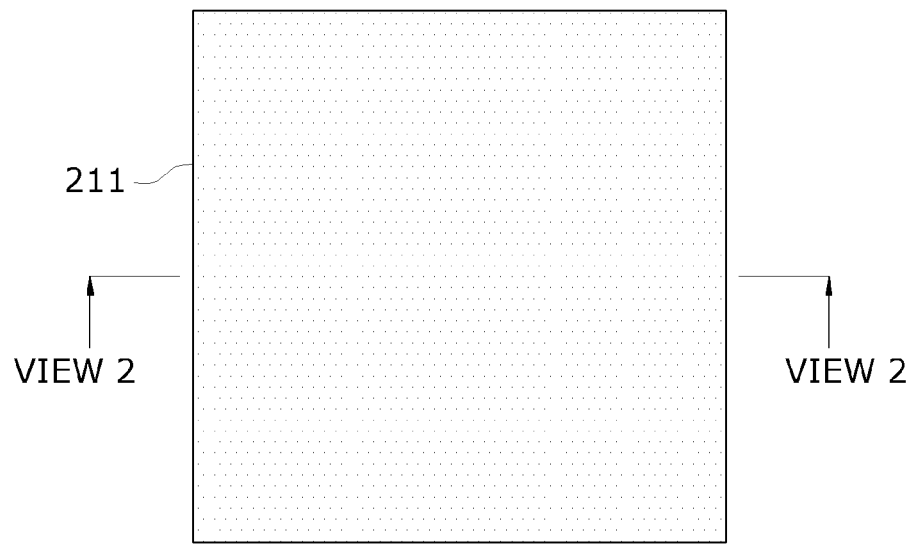
Figure 5:
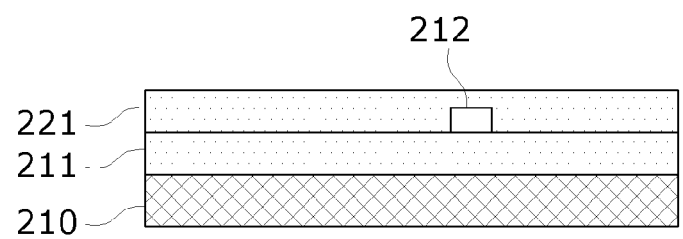
Figure 6:
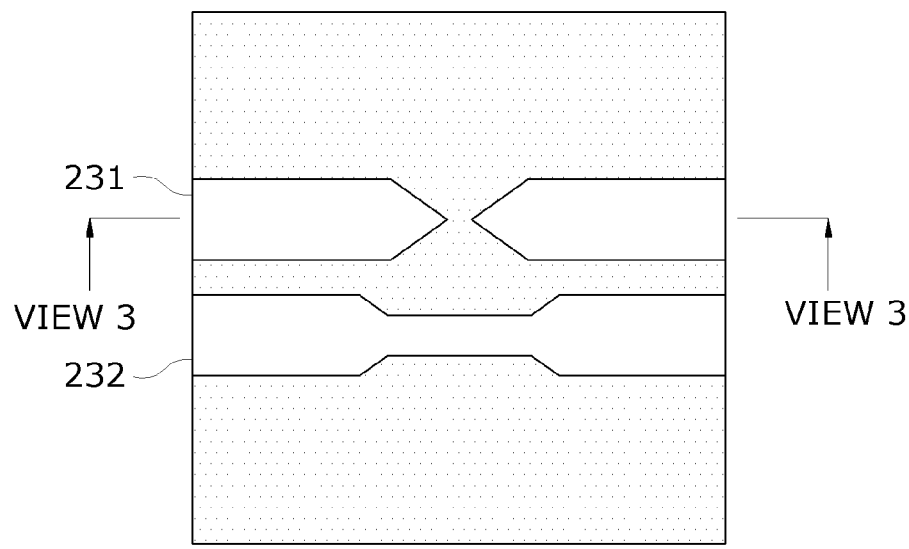
Figure 7:
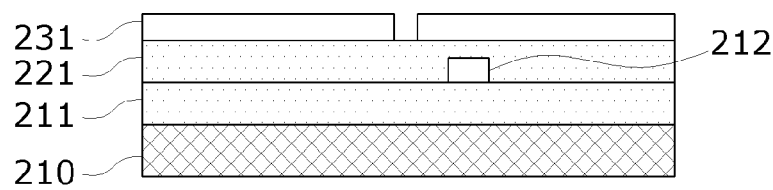
Figure 8:
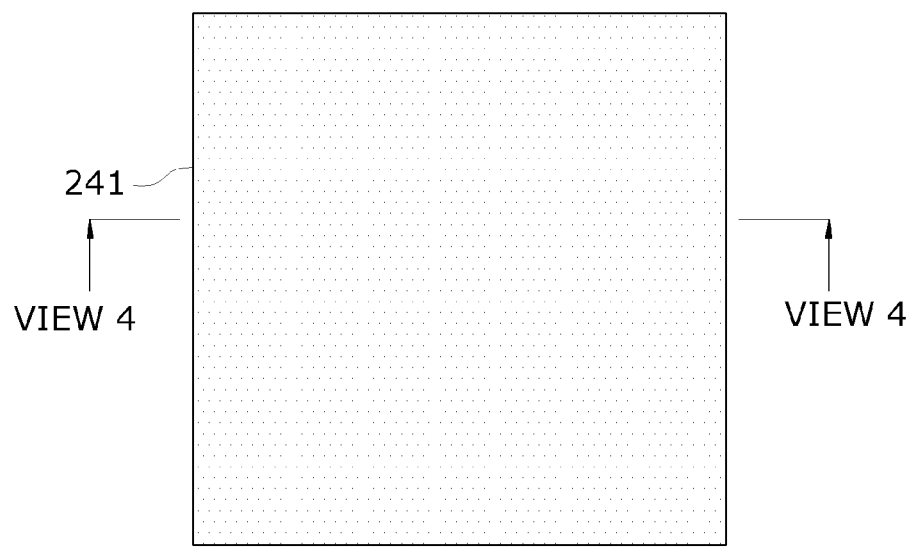
Figure 9:
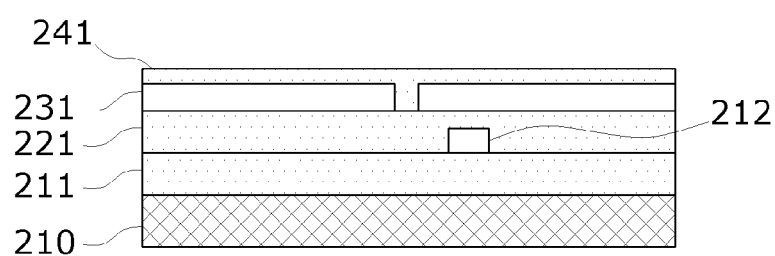
Figure 10:
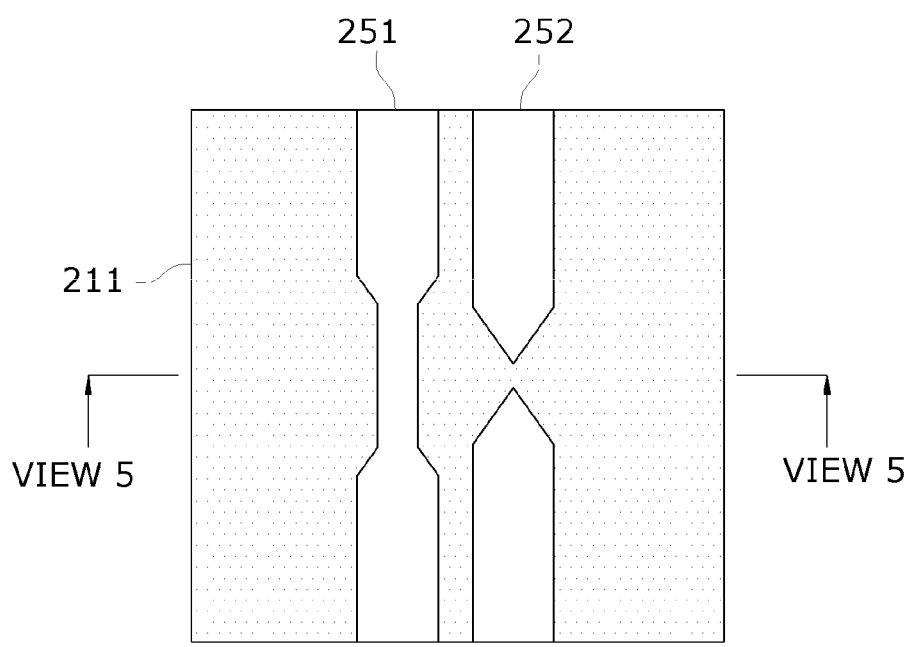
Figure 11:
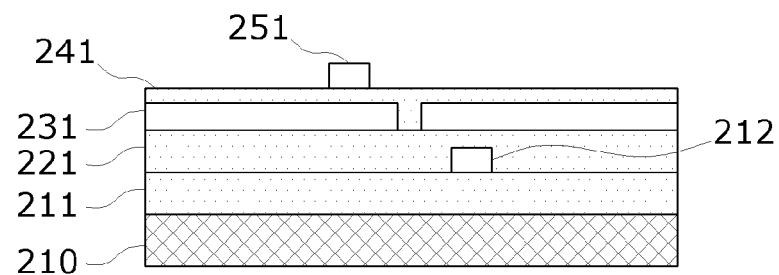
Figure 12:
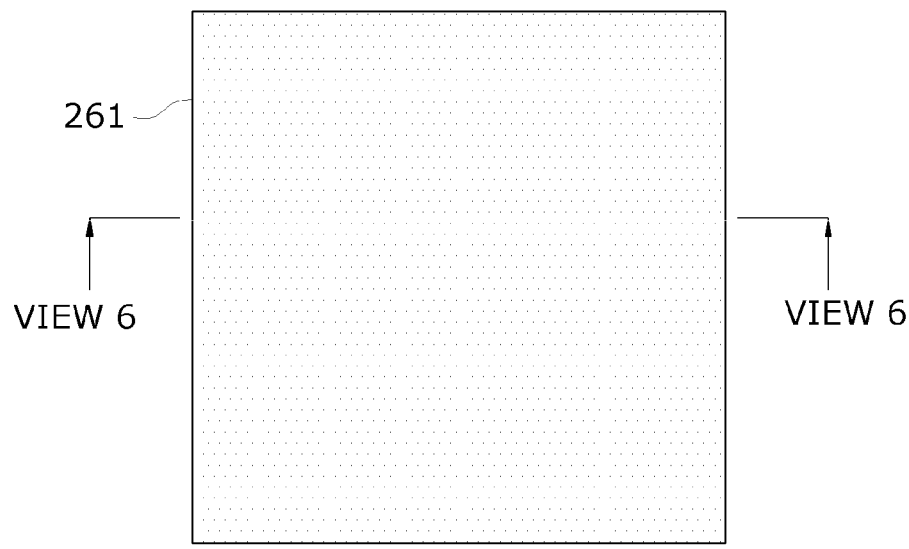
Figure 13:
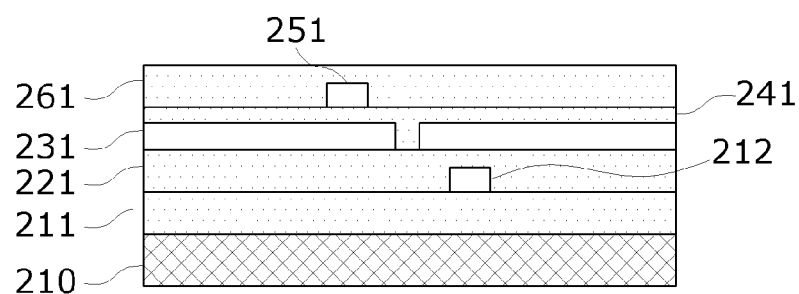
Figure 14:
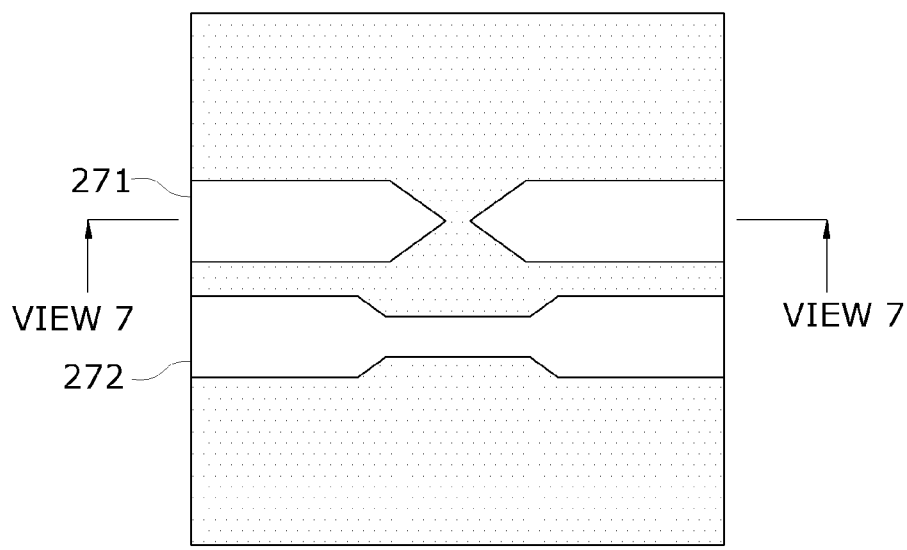
Figure 15:
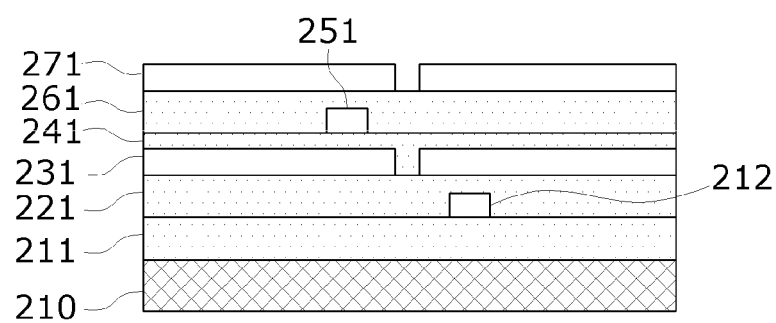
Figure 16:
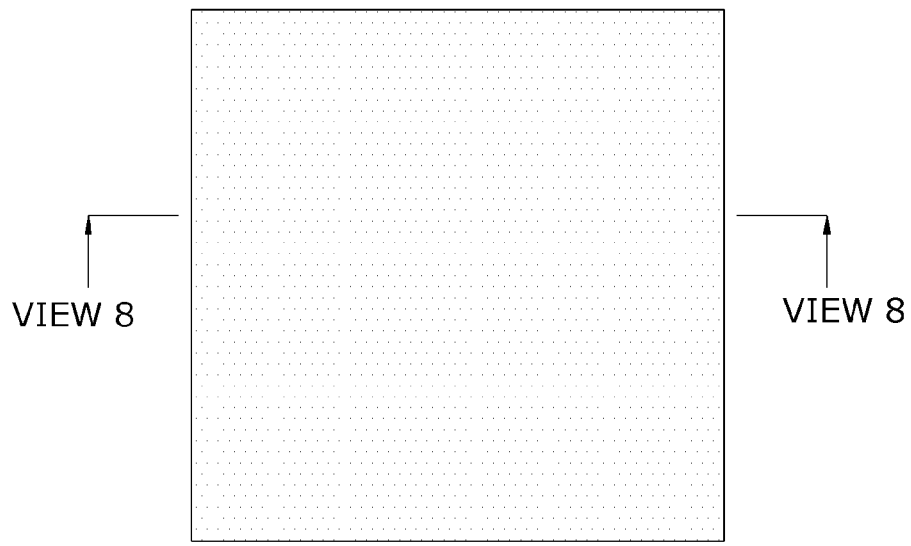
Figure 17:
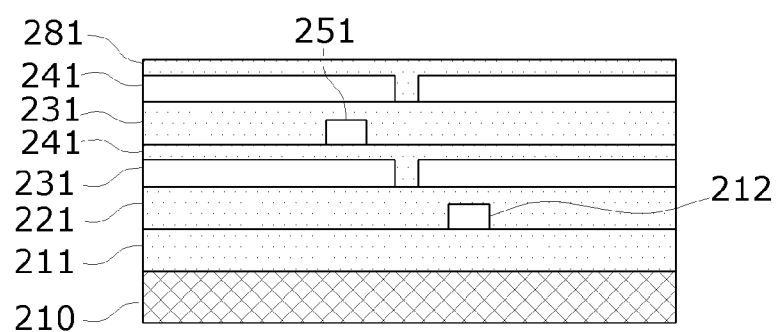

As shown in FIG. 1, a self-destructible apparatus 100 according to the present invention comprises a self-destructible operation unit 300, a variable voltage/current supply unit 400, an identification (ID) matching unit 500, and a digital physical unclonable function (PUF) ID generation unit 600.

The self-destructible operation unit 300 includes a first insulating layer 211 formed on a substrate 210, first metal layers 212 and 213 formed on the first insulating layer 211, a second insulating layer 221 formed on the first metal layers 212 and 213, second metal layers 231 and 232 formed on the second insulating layer 221, a third insulating layer 241 formed on the second metal layers 231 and 232, third metal layers 251 and 252 formed on the third insulating layer 241, a fourth insulating layer 261 formed on the third metal layers 251 and 252, fourth metal layers 271 and 272 formed on the fourth insulating layer 261, and a fifth insulating layer 281 formed on the fourth metal layers 271 and 272.

Here, the metal layers and the insulating layers may be formed by stacking a desired number of layers which is limited to the maximum number of layers provided in a semiconductor manufacturing process.

Also, according to an embodiment, in order to connect facing pin-shaped metal patterns 213, 231, 252, and 271 in parallel to one another among all of the stacked first metal layers 212 and 213, second metal layers 231 and 232, third metal layers 251 and 252, and fourth metal layers 271 and 272, conductive interlayer vias (VIA) 291, 293, and 295 are coupled to one another by the pin-shaped metal patterns disposed at one side, and conductive interlayer vias (VIA) 292, 294, and 296 are coupled to one another by the pin-shaped metal patterns disposed on the other side to form a shape in which two forks face each other.

Also, according to an embodiment, in order to connect stick-shaped metal patterns 212, 232, 251, and 272 in series to one another among all of the stacked first metal layers 212 and 213, second metal layers 231 and 232, third metal layers 251 and 252, and fourth metal layers 271 and 272, conductive interlayer vias (VIA) 301, 302, and 303 are coupled to one another such that the metal patterns are formed to be stacked in a "ㄹ" shape.

Here, the pin-shaped metal pattern is mainly used for spark generation, and the stick-shaped metal pattern is used for heating. As in the above embodiment, all of the pin-shaped metal patterns and the stick-shaped metal patterns arranged in the stacked first metal layers 212 and 213, second metal layers 231 and 232, third metal layers 251 and 252, and fourth metal layers 271 and 272 may be connected in series or in parallel by the conductive interlayer vias. However, optionally, the pin-shaped metal pattern and the stick-shaped metal pattern on a layer intended to be connected may be connected in series or in parallel.

In this case, the pin-shaped metal pattern and the stick-shaped metal pattern that are not connected may be used as a metal layer that is not for serving as the self-destructible operation unit 300 but for connecting circuits that perform general semiconductor functions.

That is, the self-destructible operation unit 300 may be broken simultaneously during a burnout, destruction, or explosion operation and thus may be used to stop the circuits that perform the general semiconductor functions.

Figure 32:
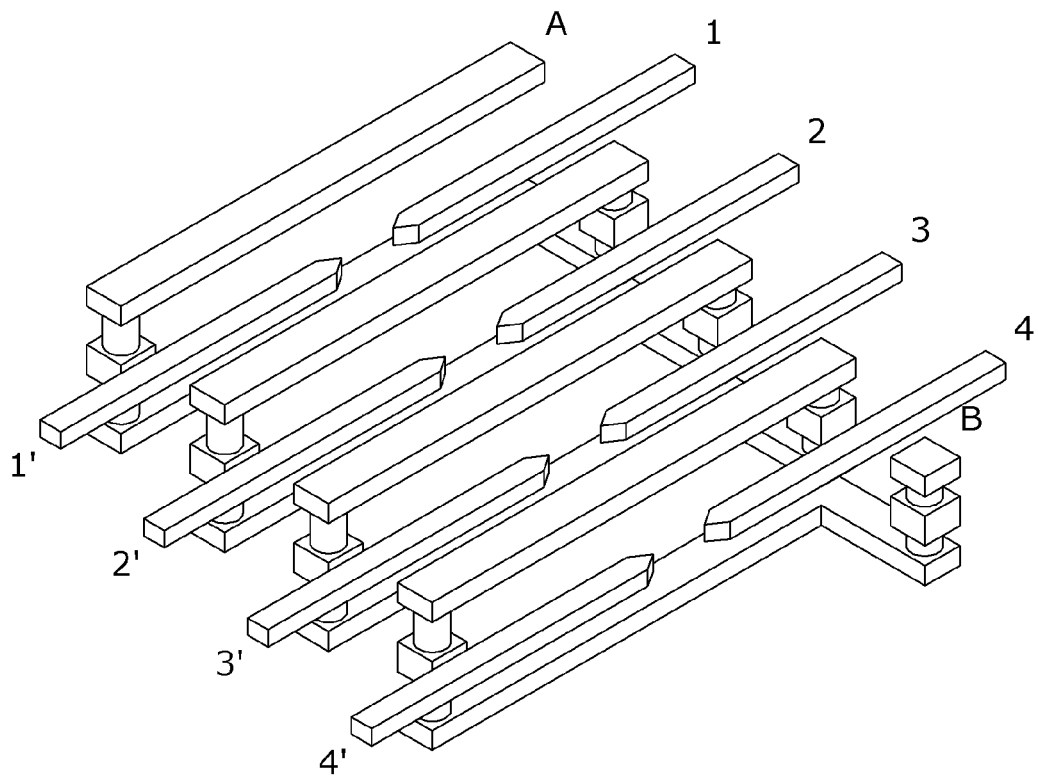

As in the above embodiment, all of the pin-shaped metal patterns and the stick-shaped metal patterns arranged in the stacked first metal layers 212 and 213, second metal layers 231 and 232, third metal layers 251 and 252, and fourth metal layers 271 and 272 may be vertically stacked. Alternatively, the pin-shaped metal patterns and the stick-shaped metal patterns may be horizontally arranged as shown in FIG. 32.

As in the above embodiment, all of the pin-shaped metal patterns arranged in the stacked first metal layers 212 and 213, second metal layers 231 and 232, third metal layers 251 and 252, and fourth metal layers 271 and 272 may be mainly used for spark generation, and all of the stick-shaped metal patterns may be used for heating or used as a coil. Depending on the configuration, only the pin-shaped metal patterns may be stacked or arranged, or only the stick-shaped metal patterns may be stacked or arranged.

Figure 27:
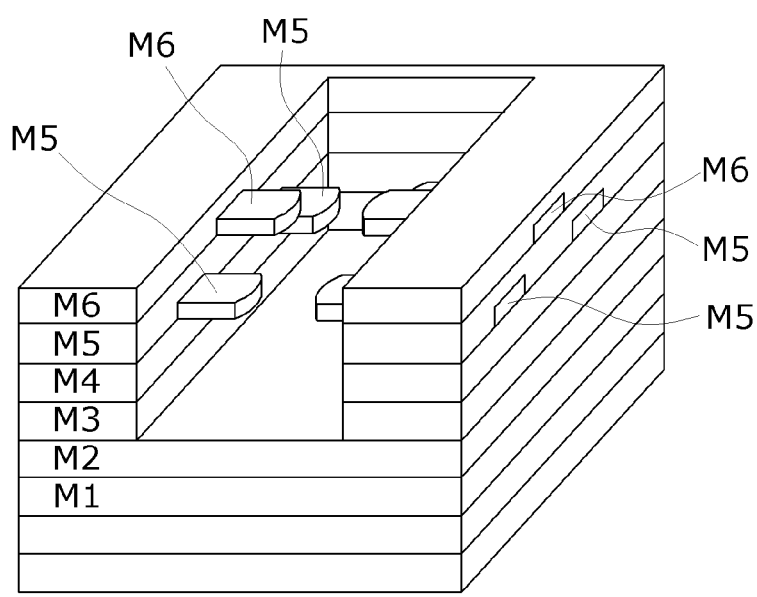
FIGS. 27 to 30 are views showing another process of forming placement or arrangement for a stacked metal layer of the self-destructible operation unit according to the present invention.
Figure 28:
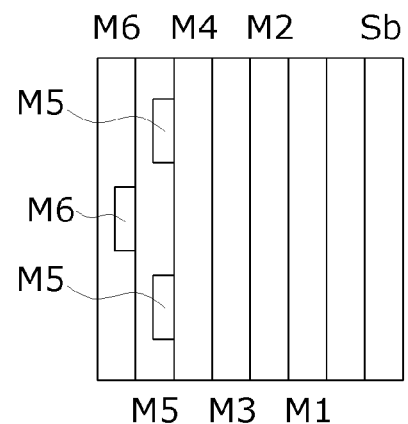
Figure 29:
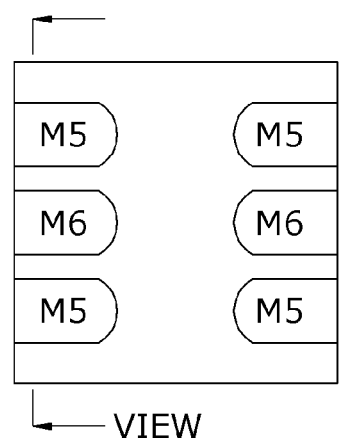

As in the above embodiment, all of the pin-shaped metal patterns and the stick-shaped metal patterns arranged in the stacked first metal layers 212 and 213, second metal layers 231 and 232, third metal layers 251 and 252, and fourth metal layers 271 and 272 may be alternately arranged for each layer, may be arranged in parallel for each layer, or may be arranged in parallel for each layer while the metal layers may be staggered with intervals without overlapping each other as shown in FIG. 27 when they are seen from the top. Or as shown in FIG. 28, several pin-shaped metal patterns may be disposed in parallel in the same layer.

Figure 30:
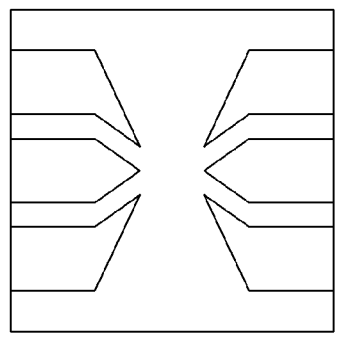

As in the above embodiment, all of the pin-shaped metal patterns arranged in the stacked first metal layers 212 and 213, second metal layers 231 and 232, third metal layers 251 and 252, and fourth metal layers 271 and 272 may be arranged with their ends being straight. Or the pin-shaped metal patterns may be curved toward a center portion as shown in FIG. 30. Or both of the straight pin-shaped metal patterns and the curved pin-shaped metal patterns may be present.

Also, according to an embodiment, an etching mask 321 having an opening 322 may be prepared on the fifth insulating layer 281 or the uppermost insulating layer to perform a dry (plasma) etching process.

In detail, when an etching process is performed on the fifth insulating layer 281, the fourth insulating layer 261, the third insulating layer 241, and the second insulating layer 221 according to a change in settings of an etching time and a plasma concentration, like the shape of the opening 322 of the etching mask by the etching process, all of the fifth insulating layer 281, the fourth insulating layer 261, the third insulating layer 241, and the second insulating layer 221 may be removed, or only the fifth insulating layer 281 may be removed, or only the fifth insulating layer 281 and the fourth insulating layer 261 may be removed, or only the fifth insulating layer 281, the fourth insulating layer 261, and the third insulating layer 241 may be removed. As a result, a cavity may be formed in which only a metal layer(s) is exposed with the removed insulating layer(s).

That is, the fourth metal layers 271 and 272, the third metal layers 251 and 252, the second metal layers 231 and 232, and the first metal layers 212 and 213 may be exposed inside the cavity by removing only the insulating layers through the dry (plasma) etching process.

Figure 21:
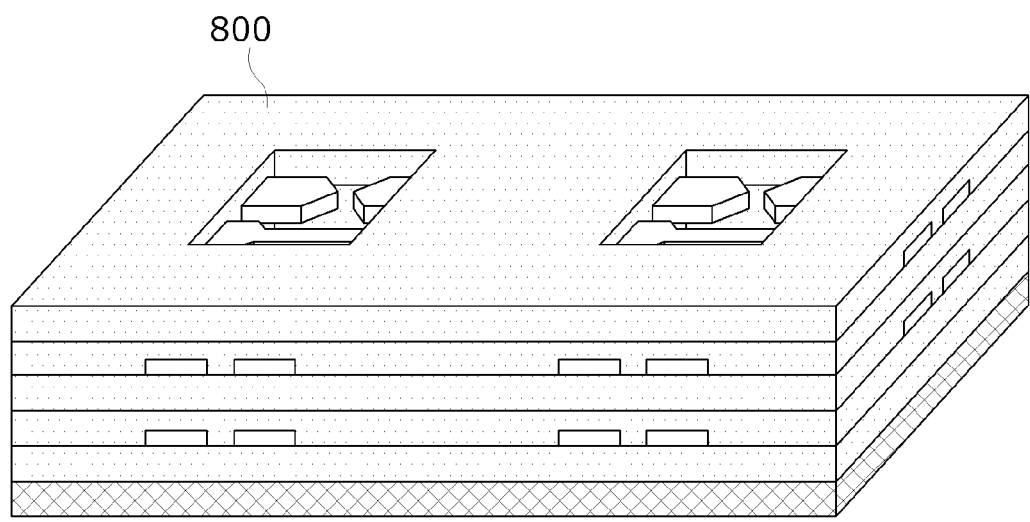

In this case, when the cavity formed in this way is called a cavity cell 800, a desired number of cavity cells may be formed as a plurality of cavity cells as shown in FIG. 21.

The self-destructible operation unit 300 is formed by injecting an ignitable or explosive material 801 into the plurality of cavity cells, injecting an adhesive 802 into the vicinity of the cavity cells 800 through an injector 803, and attaching a film or a thin-film quartz glass 804 thereto.

In this case, for ease of expression in the drawings, the first metal layers 212 and 213, the second metal layers 231 and 232, the third metal layers 251 and 252, and the fourth metal layers 271 and 272 formed in the self-destructible operation unit 300 may each be represented as metal patterns having a shape of a pair of pins facing each other and a metal pattern having a shape of a single stick, for each layer. However, when the present invention is practiced, a plurality of pin-shaped and stick-shaped metal pattern layers may be arranged in one layer.

In addition, the pin-shaped pattern may be arranged with a left pattern and a right pattern being separated by a desired distance. The pin-shaped pattern and the stick-shaped pattern may be arranged with their widths being changed. The metal patterns arranged in each layer may be stacked in parallel or separately.

In an embodiment, only four metal layers are shown. However, when the present invention is practiced, the number of metal layers is not limited thereto, and also the pin-shaped and stick-shaped patterns do not need to be placed on all the metal layers, but may be placed on only a selected layer(s).

Also, the opening of the etching mask may be changed to various shapes other than the shown quadrangular shape, and the number of cavity cells 800 may change depending on an environment and objective.

Figure 18:
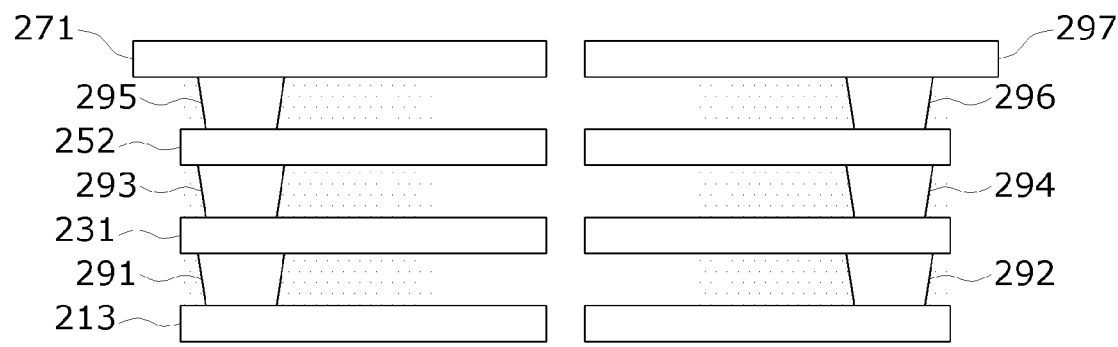
Figure 19:
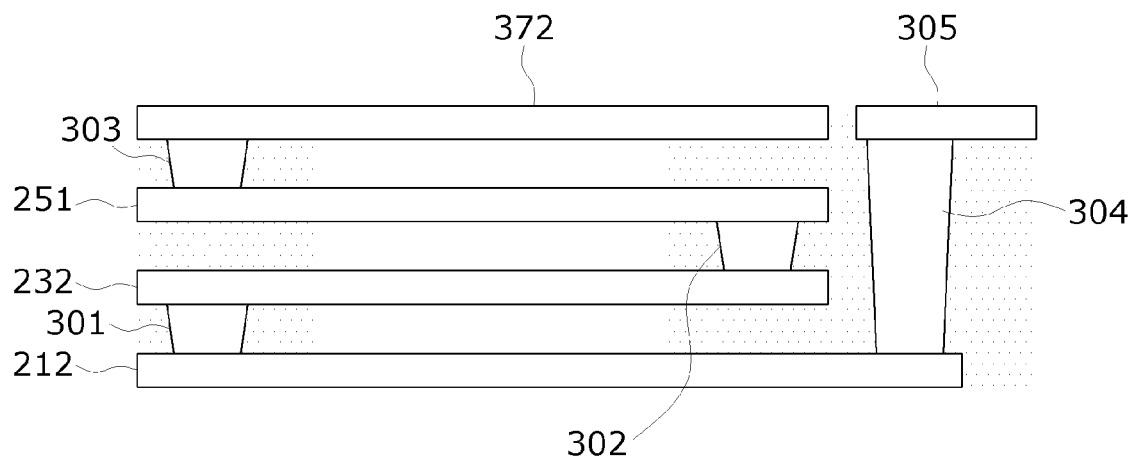
Figure 20:
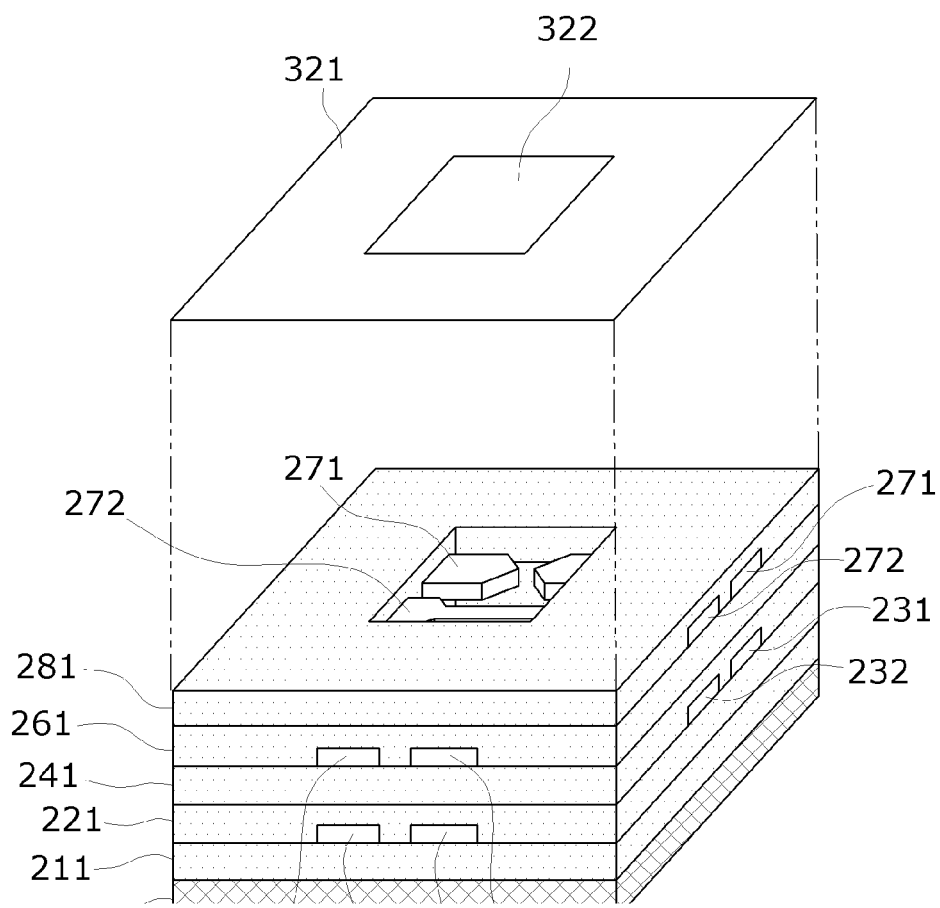
FIGS. 20 and 21 are views showing an embodiment of a cavity cell of the self-destructible apparatus according to the present invention.
Figure 22:
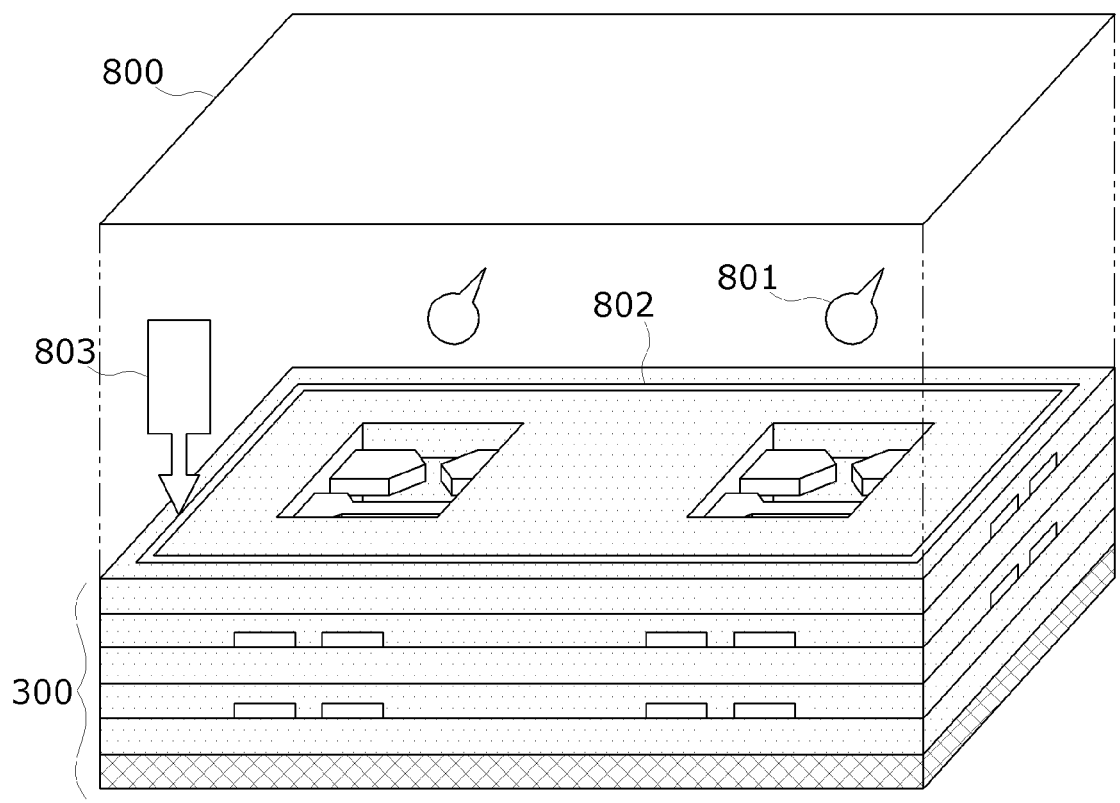
FIGS. 22 and 23 are views showing a process of filling the cavity cell of the self-destructible apparatus with an ignitable or explosive material and sealing the cavity cell according to the present invention.
Figure 23:
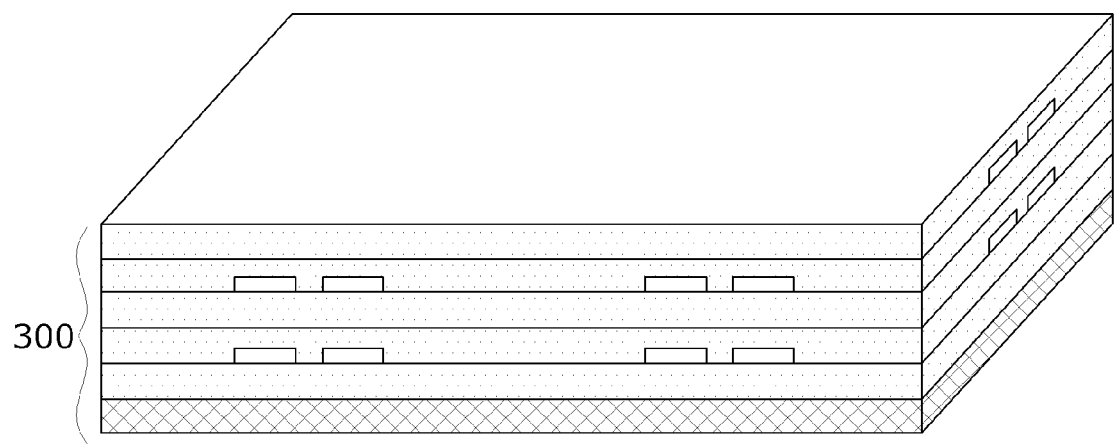

In FIGS. 22 and 23, the shape of the self-destructible operation unit has been described using an example of a cavity cell having a shape in which the metal layers are vertically stacked and exposed as shown in FIGS. 18 and 19. However, the self-destructible operation unit may be formed by applying the same process even to a cavity cell 800 having a shape in which the metal layers are horizontally arranged and exposed as shown in FIG. 32.

Figure 24:
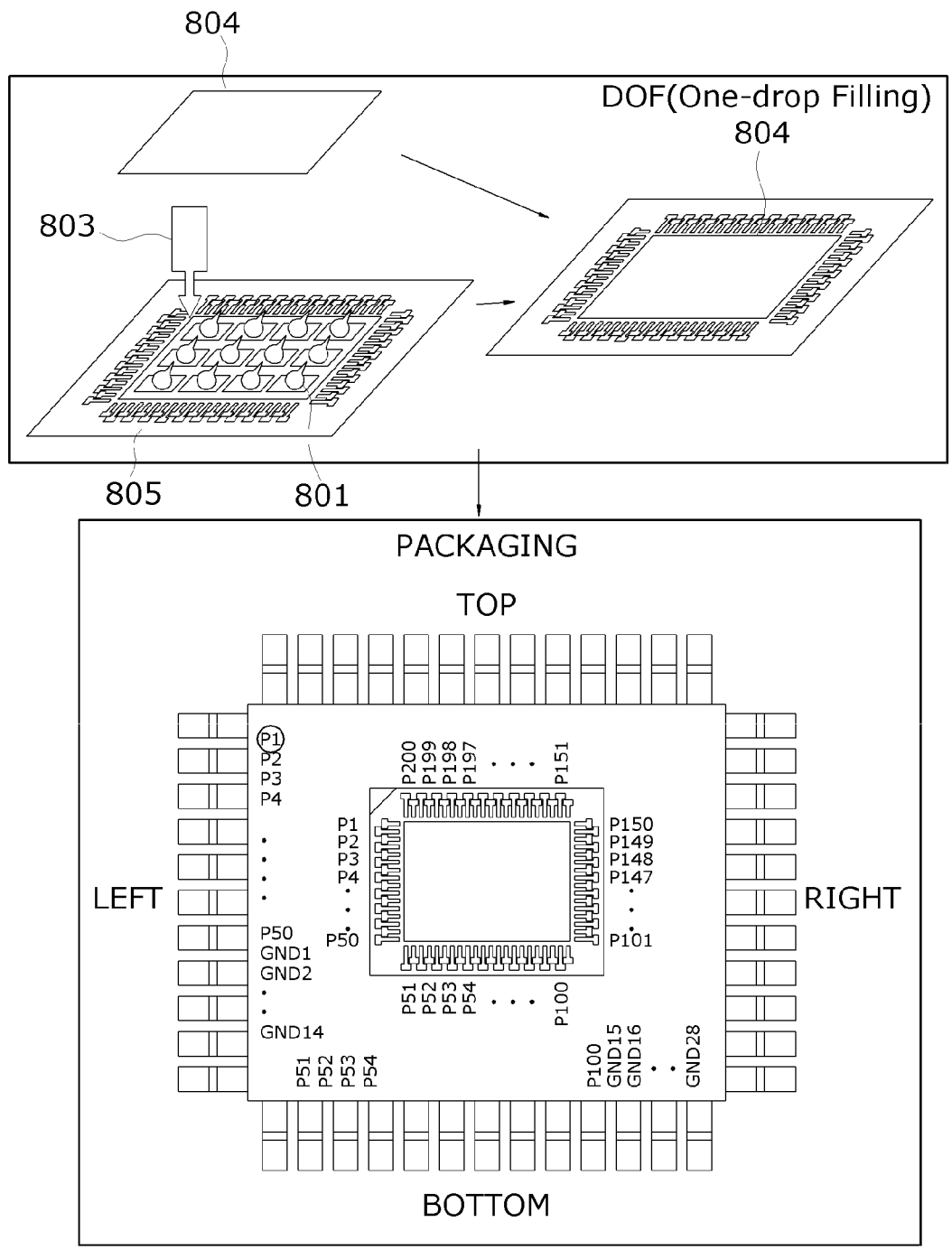
FIG. 24 is a diagram showing a package assembly process for a semiconductor chip having the self-destructible operation unit according to the present invention.
Figure 25:
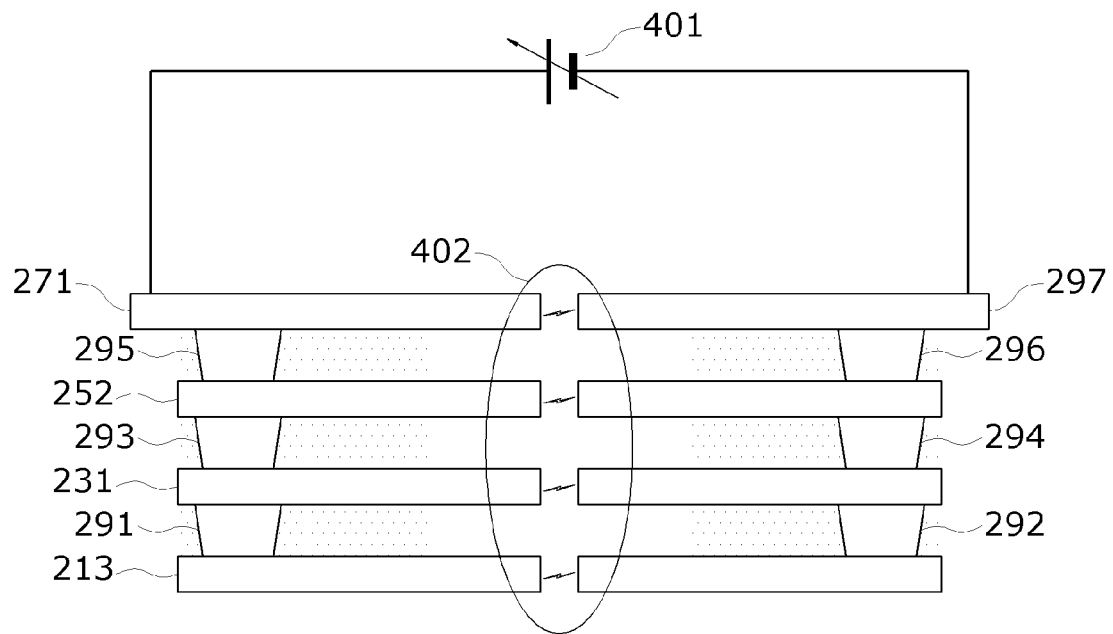
FIGS. 25 and 26 are views showing an example in which a free discharge spark occurs when a voltage is applied by a variable voltage/current supply unit applied to a metal layer exposed inside the cavity cell according to the present invention.
Figure 26:
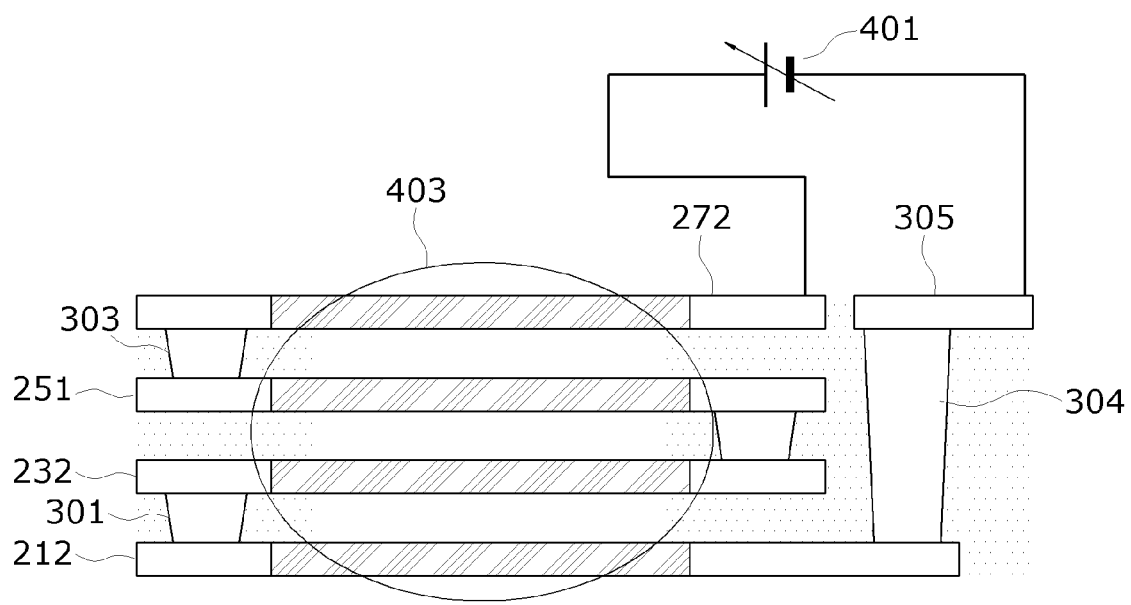

Also, the cavity cell may be designed to have a plurality of cavity cells arranged on a semiconductor die 805 of FIG. 24 while the semiconductor (semiconductor die) includes a circuit that performs original semiconductor functions.

That is, when the semiconductor die 805 is completed in which the plurality of cavity cells 800 and the circuit for the original semiconductor functions are integrated, a semiconductor chip is completed by performing a packaging process on the semiconductor die 805.

The variable voltage/current supply unit 400 connects the facing pin-shaped first metal layer, second metal layer, third metal layer, and fourth metal layer patterns 213, 231, 252, and 271 of the self-destructible operation unit 300 in parallel to one another to supply a variable voltage/current 401 between the left pin-shaped metal pattern 271 and a right pin-shaped metal pattern 297 of the uppermost metal layer.

Also, the variable voltage/current supply unit 400 connects the stick-shaped first metal layer, second metal layer, third metal layer, and fourth metal layer patterns 212, 232, 251, and 272, which are vertically stacked or horizontally arranged, in series to one another to supply a variable voltage/current 401 between the uppermost metal patterns 272 and 305.

That is, when the variable voltage/current 401 is applied between the uppermost stick-shaped metal patterns 272 and 305, a corrugated metal pattern operates as an electric heater to generate heat 403 and thus is used to reach a temperature suitable for the ignitable or explosive material 801 contained in the cavity cell 800 of the self-destructible operation unit 300 to ignite or explode.

Also, when the variable voltage/current 401 applied between the left pin-shaped metal pattern 271 and the right pin-shaped metal pattern 297 at the top of the facing pin-shaped metal patterns increases up to a voltage/current level at which electrons can be freely discharged, a free discharge spark 402 is generated, and thus the ignitable or explosive material 801 contained in the cavity cell of the self-destructible operation unit 300 ignites or explodes. As a result, the semiconductor chip is physically destroyed to cause the original operation of the semiconductor chip to malfunction. Thus, it is not possible to hack or duplicate data or functions embedded in the semiconductor chip.

Figure 31:
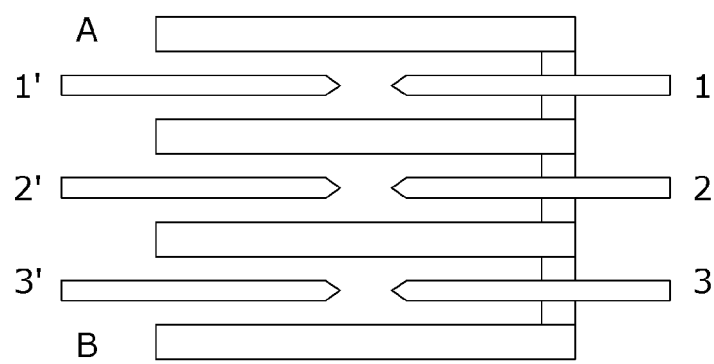
FIGS. 31 and 32 are views showing a vertical arrangement-type self-destructible operation unit and a horizontal arrangement-type self-destructible operation unit according to the present invention.

Also, as shown in FIG. 32, when a metal pattern is configured to have coil characteristics by connecting the horizontally arranged stick-shaped metal patterns in series to one another, a variable voltage/current is applied to portions A and B of FIG. 32 through the variable voltage/current supply unit 400, and a variable voltage/current is applied to pin-shaped metal patterns 1, 2, and 3 and 1', 2', and 3' of FIG. 31 through the variable voltage/current supply unit 400, the ignitable or explosive material contained in the cavity cell explodes, and thus an electron emission effect is generated due to an electromagnetic pulse effect (EMP). The electron emission effect affects destroys not only the semiconductor chip including the self-destructible operation unit within the influence of electromagnetic pulses but also any nearby electronic devices.

Figure 47:
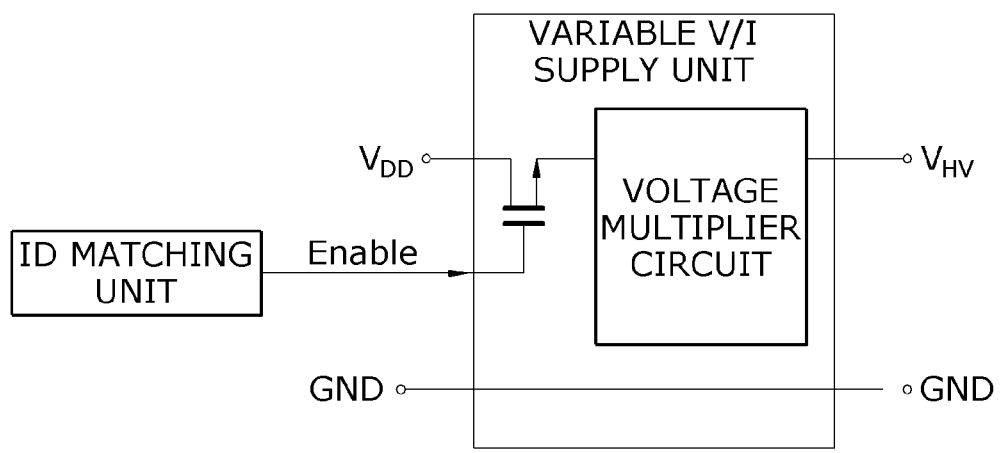
FIG. 47 is a view showing an enable state through a configuration of a variable voltage/current supply unit and an output of an ID matching check unit according to the present invention.

Referring to FIG. 47, the variable voltage/current supply unit 400 has a built-in voltage multiplier circuit capable of receiving and increasing a VDD voltage to a high voltage VHV. A switching element supplies the high voltage VHV to the self-destructible operation unit 300 by supplying or shutting off the VDD voltage through an enable signal indicating 1 or 0, which is a result value of the ID matching unit 500.

Figure 33:
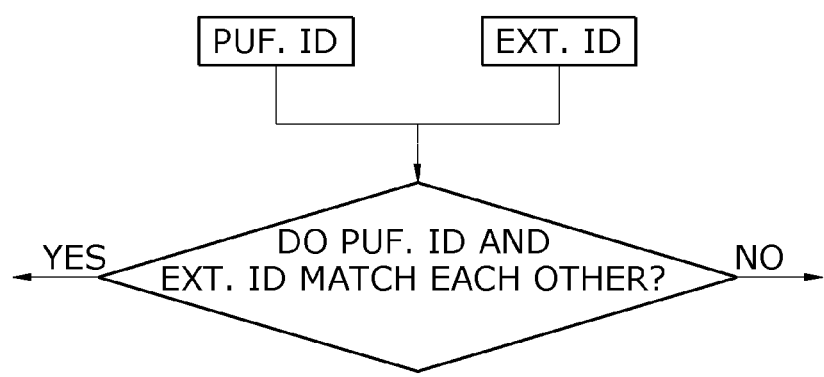
FIG. 33 is a view showing a process according to an embodiment of an identification (ID) matching check unit of the self-destructible apparatus according to the present invention.
Figure 42:
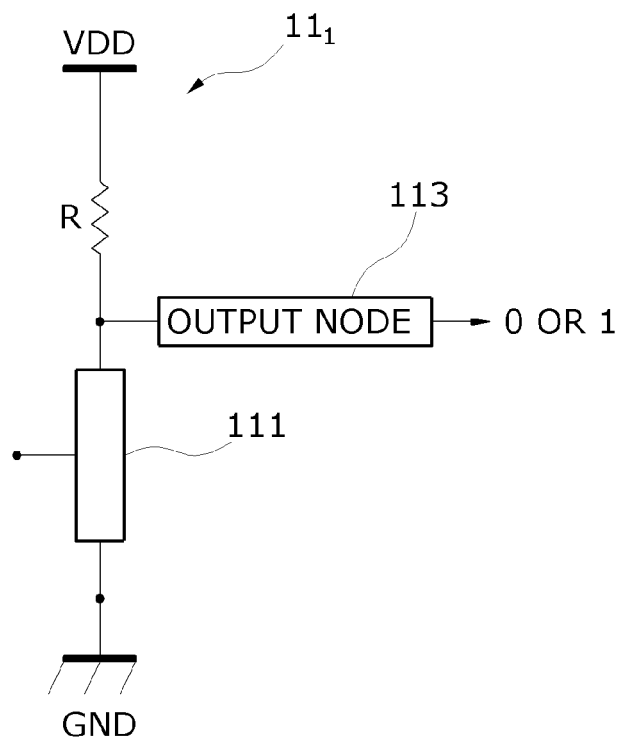

As shown in FIG. 33, the ID matching unit 500 compares a digital value PUF.ID provided by the digital PUF ID generation unit 600 to a digital value EXT.ID provided by an external ID input unit 700. The ID matching unit 500 outputs a value of "1" when the digital values match each other and outputs a value of "0" when the digital values do not match each other. As a result, as shown in FIG. 42, an enable signal indicating whether to operate the variable voltage/current supply unit 400 is provided.

The digital PUF ID generation unit 600 selectively identifies only a self-destructible operation unit 300 intended to be operated and supplies a variable voltage/current to the self-destructible operation unit 300 through the variable voltage/current supply unit 400.

That is, the digital PUF ID generation unit 600 prevents the self-destructible operation unit 300 from operating under undesired conditions, and selectively identifies and operates only the self-destructible operation unit 300 intended to be operated.

Figure 45:
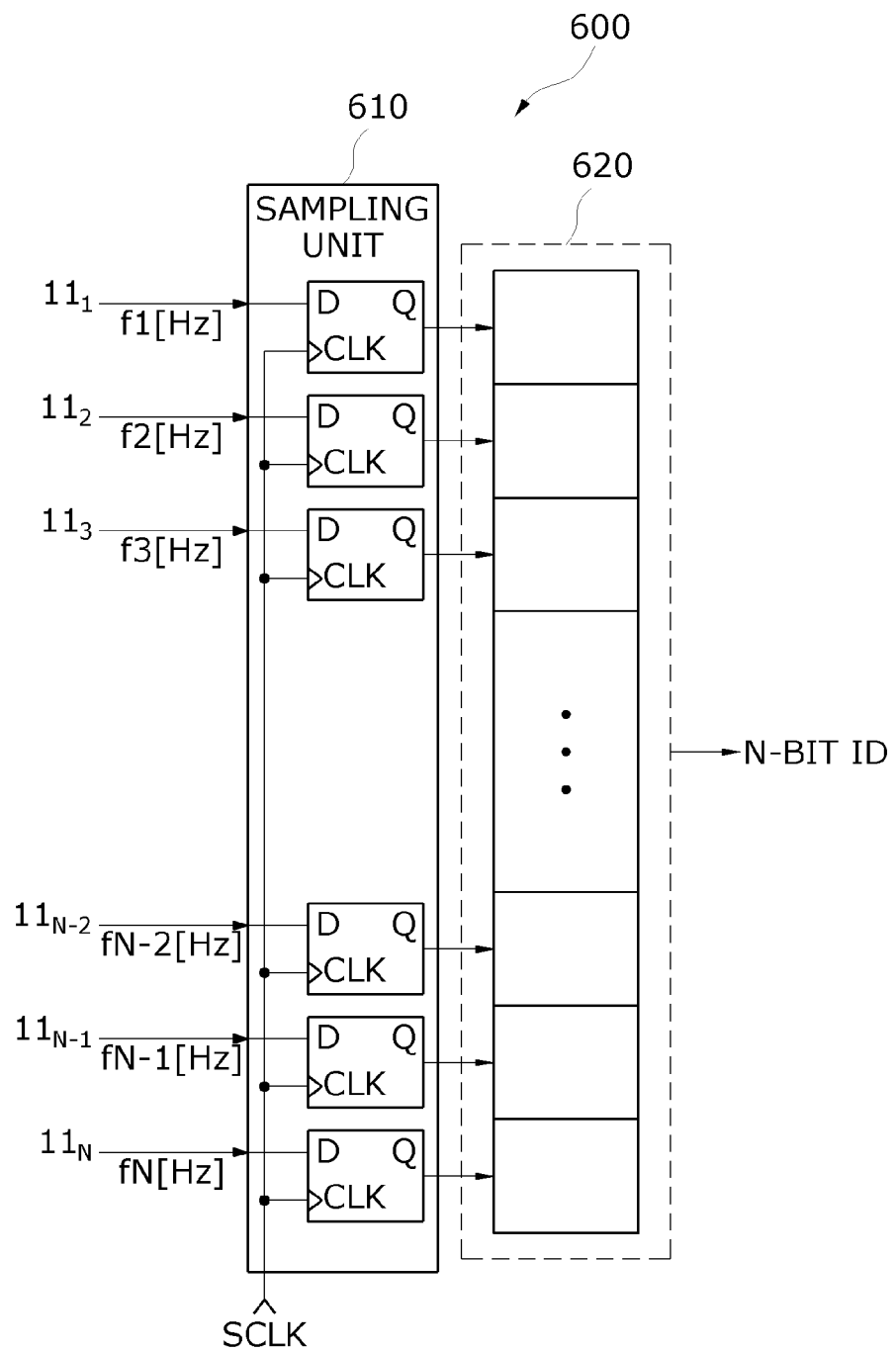

Referring to FIG. 45, the digital PUF ID generation unit 600 includes an ID generation unit 610 and an ID fetch unit 620.

The ID generation unit 610 includes a plurality of unit cells $11_1$ to $11_N$ and outputs a plurality of digital bits output from the plurality of unit cells $11_1$ to $11_N$ to the ID fetch unit 620.

Also, each of the plurality of unit cells $11_1$ to $11_N$ may generate a 1-bit digital value.

Also, each of the plurality of unit cells $11_1$ to $11_N$ may generate a binary digital value of 0 or 1 through electrical connection or disconnection of an ID generation element.

Subsequently, the ID fetch unit 620 receives the digital values output from each of the plurality of unit cells $11_1$ to $11_N$ of the ID generation unit 610 and outputs an N-bit ID using the plurality of digital bits.

Also, the N-bit ID output by the ID fetch unit 620 corresponds to PUF. ID, as shown in FIG. 33.

The ID generation element according to an embodiment of the present invention will be described below with reference to FIG. 40. For an ID generation element A, a first lower electrode and a second lower electrode are formed in the same layer, a second via and a third via are formed in the same layer, a first upper electrode and a first via are electrically connected to each other, the first lower electrode, the second via, the second lower electrode, the third via, and a third lower electrode are electrically connected to each other. Depending on whether the first via is electrically connected to or disconnected from the first lower electrode, the second via, the second lower electrode, the third via, or the third lower electrode, the binary digital value of 0 or 1 is generated.

Figure 40:
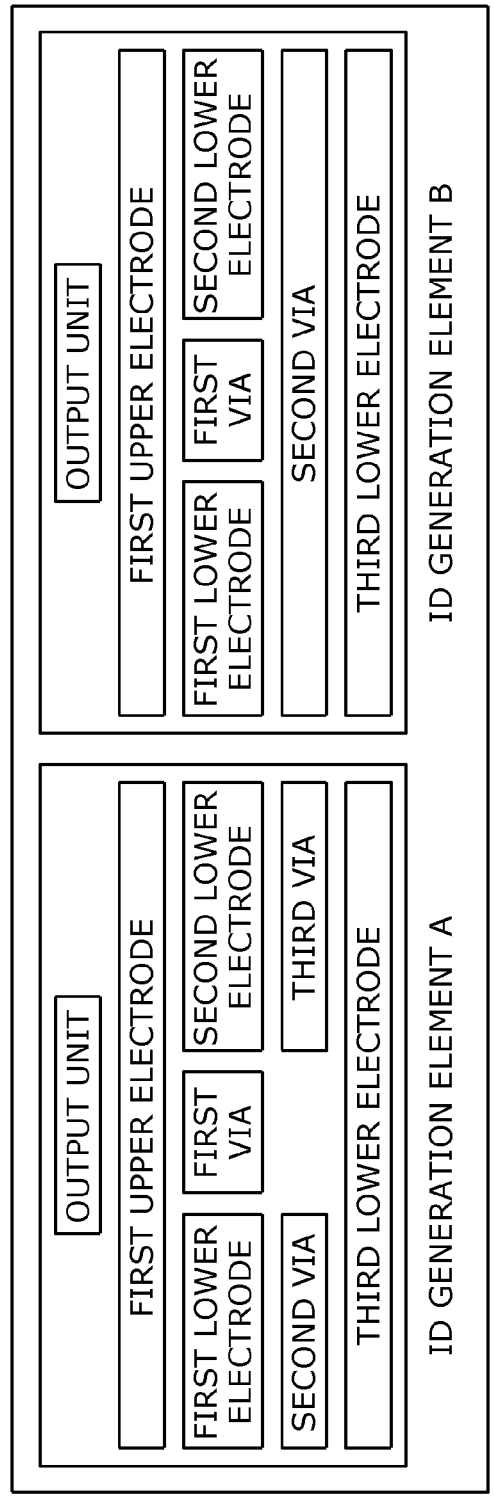
FIG. 40 is a block diagram showing an ID generation element of the self-destructible apparatus according to the present invention.

Referring to FIG. 40, for an ID generation element B, a first lower electrode and a second lower electrode are formed in the same layer, a first upper electrode and a first via are electrically connected, and the first lower electrode, a second via, and a third lower electrode are electrically connected. Depending on whether the first via is electrically connected to or disconnected from the first lower electrode, the second via, or the second lower electrode, the binary digital value of 0 or 1 is generated.

For the ID generation element A shown in FIG. 40, the first lower electrode, the second lower electrode, and the third lower electrode are placed under the first upper electrode. The first lower electrode and the second lower electrode are formed in the same layer, and the third lower electrode is formed in another layer. The second via is formed between the first lower electrode and the third lower electrode, and an insulating film is placed where the second via is not formed.

Also, the third via is formed between the second lower electrode and the third lower electrode, and an insulating film is placed where the third via is not formed.

Here, for convenience, only the first upper electrode is shown and no other electrodes are shown over the first upper electrode. However, a larger number of upper electrodes may be formed in different layers.

Also, for convenience, the second lower electrode and the third lower electrode are shown. However, a larger number of lower electrodes may be formed in different layers.

Moreover, the second via is formed by filling a via hole formed under the first lower electrode with a conductor to provide a connection to the third lower electrode.

Also, the third via is formed by filling a via hole formed under the second lower electrode with a conductor to provide a connection to the third lower electrode. Furthermore, the first via is formed by filling a via hole formed under the first upper electrode with a conductor to provide a connection to the first upper electrode.

Also, when the first via reaches the first lower electrode, the second via, the second lower electrode, the third via, or the third lower electrode, the electric connection to the first upper electrode is established. On the other hand, when the first via does not reach the first lower electrode, the second via, the second lower electrode, the third via, and the third lower electrode, the electric connection to the first upper electrode is cut off.

Moreover, depending on whether the first upper electrode and the first via are electrically connected to or disconnected from the first lower electrode, the second via, the third lower electrode, the second lower electrode, and the third via, an output unit generates a binary digital value of 0 or 1 and outputs the generated binary digital value.

For the ID generation element B shown in FIG. 40, the first lower electrode, the second lower electrode, and the third lower electrode are placed under the first upper electrode. The first lower electrode and the second lower electrode are formed in the same layer, and the third lower electrode is formed in another layer.

Moreover, the second via is formed between the first lower electrode and the third lower electrode, and an insulating film is placed where the second via is not formed.

Also, the second via is formed between the second lower electrode and the third lower electrode, and an insulating film is placed where the second via is not formed.

Here, for convenience, only the first upper electrode is shown and no other electrodes are shown over the first upper electrode, but a larger number of upper electrodes may be formed in different layers.

Also, for convenience, the first lower electrode, the second lower electrode, and the third lower electrode are shown, but a larger number of lower electrodes may be formed in different layers.

Furthermore, the second via is formed by filling a via hole formed under the first lower electrode and the second lower electrode with a conductor to provide a connection to the third lower electrode.

Also, the first via is formed by filling a via hole formed under the first upper electrode with a conductor to provide a connection to the first upper electrode.

Moreover, when the first via reaches the first lower electrode, the second via, or the second lower electrode, the electrical connection to the first upper electrode is established.

On the other hand, when the first via does not reach the first lower electrode, the second via, and the second lower electrode, the electrical connection is cut off.

Also, depending on whether the first upper electrode and the first via are electrically connected to or disconnected from the first lower electrode, the second via, and the second lower electrode, the output unit generates a binary digital value of 0 or 1 and outputs the generated binary digital value.

Figure 34:
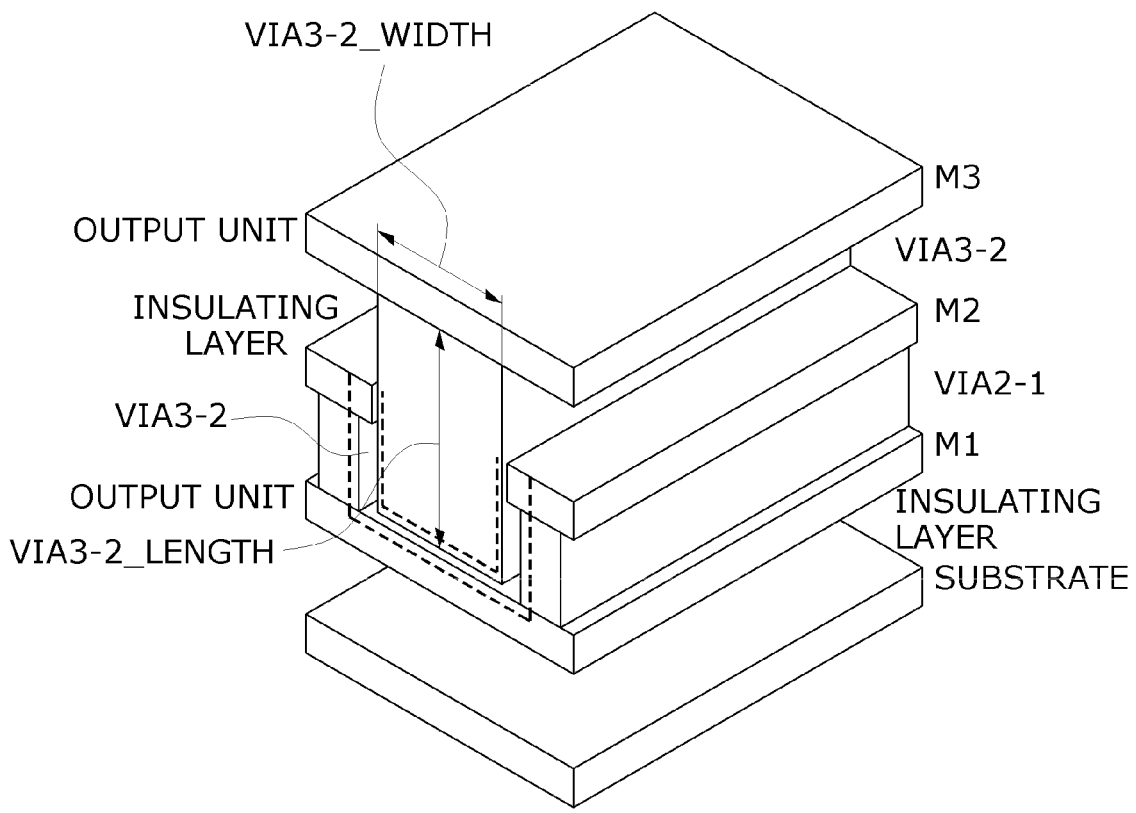
FIGS. 34 and 35 are a perspective view and a sectional view of an ID generation element A of the self-destructible apparatus according to the present invention.

Referring to FIG. 34, which shows an embodiment of the ID generation element A, an insulating film (layer) is formed over a substrate, a third lower electrode (metal layer) M1 is formed over the insulating film (layer), and an insulating film is formed over the third lower electrode.

Also, a second via hole is formed for connection between a first lower electrode M2 and the third lower electrode M1 through an etching process, and a third via hole is formed for connection between a second lower electrode M2 and the third lower electrode M1 through an etching process.

Also, when the formed second via hole and third via hole are filled with a conductor, a via VIA2-1 is formed, a first lower electrode is formed over the second via, a second lower electrode is formed over the third via, and an insulating film (layer) is formed over the first lower electrode and the second lower electrode.

Also, a first via hole is formed over the insulating film (layer) through an etching process for connection to a first upper electrode M3. When the first via hole is filled with a conductor, a via VIA3-2 is formed, and the first upper electrode is formed over the via.

In this case, the first upper electrode M3, the first lower electrode M2, the second lower electrode M2, and the third lower electrode M1 may each include a connection member for connection to a voltage source.

Also, as shown in FIG. 34, a length of the first via VIA3-2_length increases or decreases in proportion to an increase or decrease in a width of the first via VIA3-2_width.

Accordingly, when the width of the first via VIA3-2_width increases, an electrical connection to a hollow metal quadrangular pocket shape M2 & VIA2-1 & M1 & VIA2-1 & M2 composed of the first lower electrode (metal layer) M2, the second via VIA2-1, the third lower electrode (metal layer) M1, the third via VIA2-1, and the second lower electrode (metal layer) M2 is established.

On the other hand, when the width of the first via VIA3-2 decreases, the electrical connection to the hollow metal quadrangular pocket shape M2 & VIA2-1 & M1 & VIA2-1 & M2 composed of the first lower electrode (metal layer) M2, the second via VIA2-1, the third lower electrode (metal layer) M1, the third via VIA2-1, and the second lower electrode (metal layer) M2 is cut off.

Figure 38:
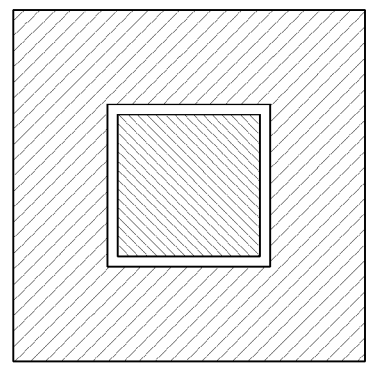

While the electrical connection is cut off, a capacitance is formed between the first via VIA3-2 and the hollow metal quadrangular pocket shape M2 & VIA2-1 & M1 & VIA2-1 & M2 composed of the first lower electrode (metal layer) M2, the second via VIA2-1, the third lower electrode (metal layer) M1, the third via VIA2-1, and the second lower electrode (metal layer) M2, and a portion between the first upper electrode (metal layer) M3 and the first lower electrode (metal layer) M2, that is, a dotted part of FIG. 38 acts as a capacitance element.

Subsequently, an embodiment of the ID generation element B will be described with reference to FIG. 38. An insulating film (layer) is formed over a substrate, a third lower electrode (metal layer) M1 is formed over the insulating film (layer), and an insulating film is formed over the third lower electrode.

Also, a second via hole is formed through an etching process for connection between a first lower electrode and a second lower electrode. When the formed second via hole is filled with a conductor, a via VIA2-1 is formed. The first lower electrode M2 and the second lower electrode M2 are formed over the second via VIA2-1.

Also, an insulating film (layer) is formed over the first lower electrode M2 and the second lower electrode M2, and a first via hole is formed over the insulating film (layer) through an etching process for connection to a first upper electrode M3. When the first via hole is filled with a conductor, a via VIA3-2 is formed, and the first upper electrode M3 is formed over the via.

In this case, the first upper electrode, the first lower electrode, the second lower electrode, and the third lower electrode may each include a connection member for connection to a voltage source. As shown in FIG. 38, a length of the first via VIA3-2_length increases or decreases in proportion to an increase or decrease in a width of the first via VIA3-2_width.

Accordingly, when the width of the first via VIA3-2_witdh increases, an electrical connection to a hollow metal quadrangular pocket shape M2 & VIA2-1 & M2 composed of the first lower electrode (metal layer) M2, the second via VIA2-1, and the second lower electrode (metal layer) M2 is established.

On the other hand, when the width of the first via VIA3-2_width decreases, the electrical connection to the hollow metal quadrangular pocket shape M2 & VIA2-1 & M2 composed of the first lower electrode (metal layer) M2, the second via VIA2-1, and the second lower electrode (metal layer) M2 is cut off.

While the electrical connection is cut off, a capacitance is formed between the first via VIA3-2 and the hollow metal quadrangular pocket shape M2 & VIA2-1 & M2 composed of the first lower electrode (metal layer) M2, the second via VIA2-1, and the second lower electrode (metal layer) M2, and a portion between the first upper electrode (metal layer) M3 and the first lower electrode (metal layer) M2, that is, a dotted part of FIG. 23 acts as a capacitance element.

Figure 39:
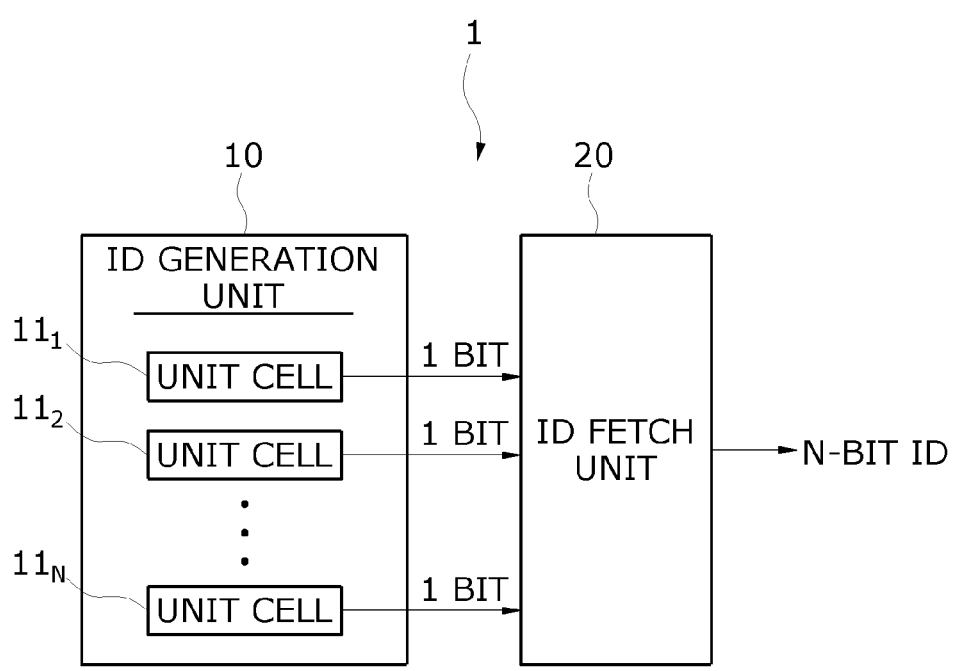
FIG. 39 is a view showing a digital physical unclonable function (PUF) ID generation unit of the self-destructible apparatus according to the present invention.

The ID generation elements formed in this way may be used as ID generation elements of N unit cells $11_1$ to $11_N$ of FIG. 39.

Figure 41:
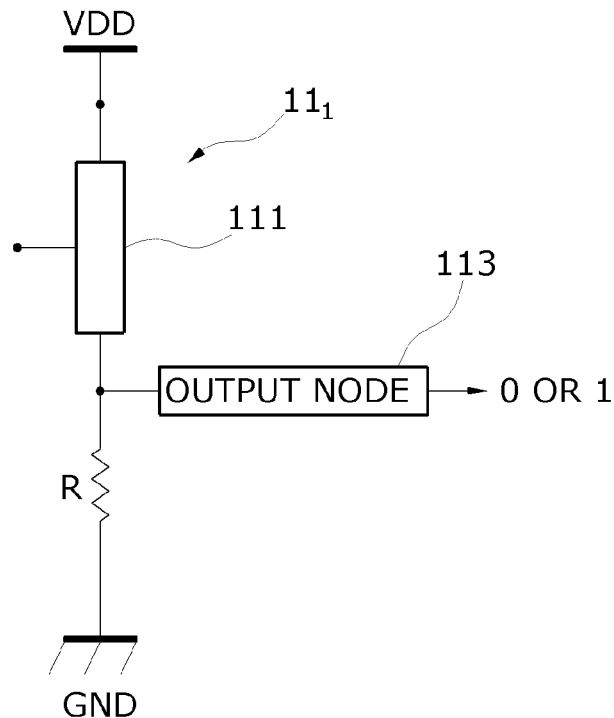
FIGS. 41 to 43 are views showing an embodiment of a unit cell of the self-destructible apparatus according to the present invention.

Subsequently, FIGS. 41 and 42 show a unit cell according to an embodiment of the present invention. In FIGS. 41 and 42, only one unit cell $11_1$ is shown, but the other unit cells $11_2$ to $11_N$ may be the same or similar to the unit cell $11_1$.

Referring to FIGS. 41 and 42, the unit cell $11_1$ may include an ID generation element 111 and an output node 113, and the unit cell $11_1$ may further include a resistor R.

Figure 35:
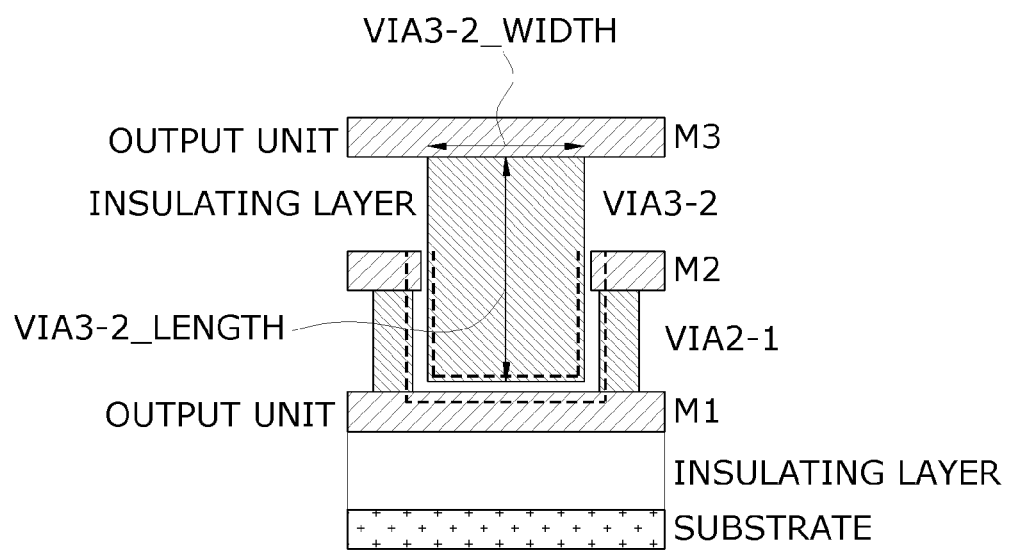
Figure 36:
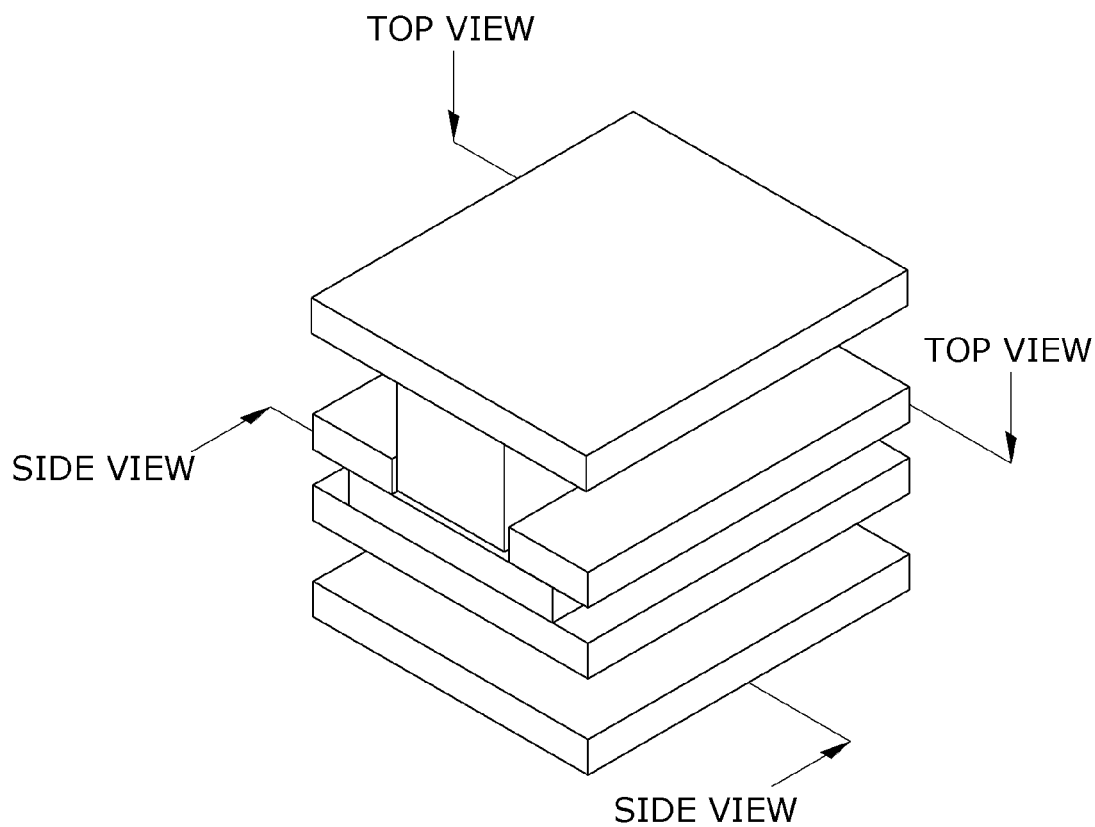
FIGS. 36 to 38 are a perspective view, a side-sectional view, and a cross-sectional view showing an ID generation element B of the self-destructible apparatus according to the present invention.
Figure 37:
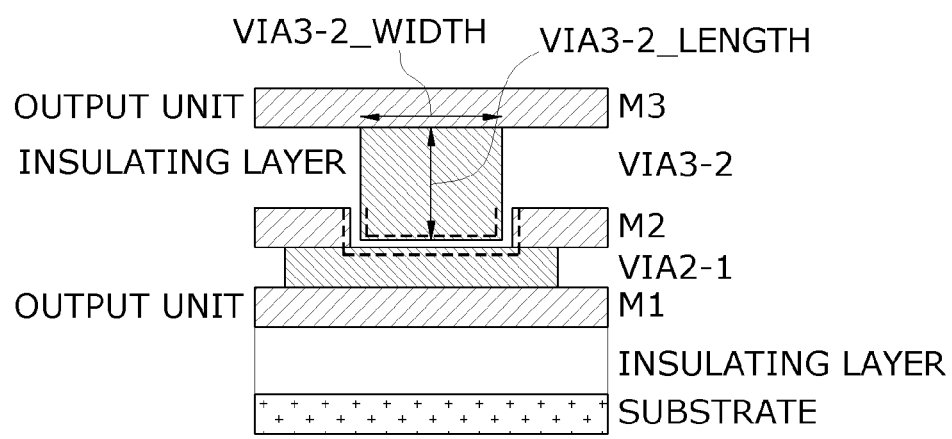

Also, the ID generation element 111 may be one of the ID generation element A and the ID generation element B that are described with reference to FIGS. 34 and 35.

That is, the ID generation element 111 is connected between a reference voltage source VDD and one end of the resistor R, and the other end of the resistor R is connected to a ground voltage source GND.

In detail, the first upper electrode is connected to the reference voltage source VDD, and the first lower electrode, the second lower electrode, or the third lower electrode is connected to the resistor R connected to the ground voltage source GND.

Also, the first lower electrode, the second lower electrode, or the third lower electrode is connected to the output node 113, and the output node 113 outputs a binary digital value of 0 or 1 by electrically connecting to or disconnecting from the first upper electrode, the first lower electrode, the second lower electrode, or the third lower electrode.

As described above, the length of the first via VIA3-2_length increases or decreases in proportion to an increase or decrease in the width of the first via VIA3-2_width. In the ID generation element A, it is determined that whether the first upper electrode electrically connects to or disconnects from the first lower electrode, the third lower electrode, or the second lower electrode, depending on whether the first via reaches the first lower electrode, the second via, the third lower electrode, the third via, or the second lower electrode, and thus it is determined that whether the binary digital value is 0 or 1.

In the ID generation element B, it is determined whether the first upper electrode electrically connects to or disconnects from the first lower electrode, the third lower electrode, or the second lower electrode, depending on whether the first via reaches the first lower electrode, the second via, or the second lower electrode, and thus it is determined whether the binary digital value is 0 or 1.

Unlike this, as shown in FIG. 42, the resistor R may be connected between the first upper electrode and the reference voltage source VDD. The first lower electrode, the third lower electrode, or the second lower electrode may be connected to the ground voltage source GND, and the first upper electrode may be connected to the output node 113.

As described above with reference to FIG. 39, an ID generation unit 10 includes N unit cells $11_1$ to $11_N$ in order to generate an N-bit ID. The N unit cells $11_1$ to $11_N$ may have the same configuration as the unit cell shown in FIG. 41 or may have the same configuration as the unit cell shown in FIG. 42, or may be composed of unit cells configured as the unit cell shown in FIG. 41 and unit cells configured as the unit cell shown in FIG. 42 together.

Also, in order for the N unit cells $11_1$ to $11_N$ to uniformly show 1s and 0s, some of the N unit cells $11_1$ to $11_N$ may be composed of the ID generation element A shown in FIG. 34, and the others may be composed of the ID generation element B shown in FIG. 38.

For example, when among N binary digital values output from the N unit cells $11_1$ to $11_N$, the number of 1s is N/2 and the number of 0s is N/2, it can be said that 0 and 1 are uniform in an ID.

Accordingly, in order to obtain an N-bit ID in which 0 and 1 are uniform, the N unit cells $11_1$ to $11_N$ should be designed such that the ID generation element in which the first upper electrode is electrically connected to the first lower electrode, the second lower electrode, or the third lower electrode may have the same ratio as the ID generation element in which the first upper electrode is electrically disconnected from the first lower electrode, the second lower electrode, or the third lower electrode.

In this case, depending on whether the width of the first via VIA3-2_width is wide or narrow, whether the first upper electrode is electrically connected to or disconnected from the first lower electrode, the third lower electrode, or the second lower electrode is determined. In addition, there may be various variables. For example, a via hole for forming the first via is formed on an insulating film. In this case, the thickness or material of the insulating film and the time or temperature of the etching process, etc. may act as variables during a semiconductor etching process. The variables act during the semiconductor etching process such that the electrical connection or disconnection between the first upper electrode and the first lower electrode, the second lower electrode, or the third lower electrode is randomly performed.

Therefore, by appropriately adjusting and controlling these variables, it is possible to implement N unit cells $11_1$ to $11_N$ for obtaining an N-bit ID in which 0 and 1 are uniform, and also it is possible to check the uniformity of 0 and 1 by arranging multiple ID generation elements corresponding to design and process values having different variables to produce the ID generation unit or the ID fetch unit as a prototype at low chip manufacturing cost using a multi-project wafer (MPW) process as a technique of producing a semiconductor chip. In addition, by checking the uniformity of 0 and 1, selecting parameters with the ensured uniformity, and applying the parameters to a mass production process, it is possible to implement unit cells $11_1$ to $11_N$ that uniformly output 0s and 1s.

Meanwhile, the ID generation element A shown in FIG. 34 may function as a capacitor of an electronic component because the first via is formed inside the hollow metal quadrangular pocket shape M2 & VIA2-1 & M1 & VIA2-1 & M2 composed of the first lower electrode (metal layer) M2, the second via VIA2-1, the third lower electrode (metal layer) M2, the third via, and the second lower electrode.

In this case, depending on whether the width of the first via VIA3-2_width is designed to be wide or narrow, the length of the first via VIA3-2_length changes, and thus the capacitance has different values.

The ID generation element B shown in FIG. 38 may function as a capacitor of an electronic component because the first via is formed inside the hollow metal quadrangular pocket shape M2 & VIA2-1 & M2 composed of the first lower electrode (metal layer) M2, the second via VIA2-1, and the second lower electrode.

In this case, depending on whether the width of the first via VIA3-2_width is designed to be wide or narrow, the length of the first via VIA3-2_length changes, and thus the capacitance has different values.

A unit cell using such a characteristic will be described with reference to FIG. 43.

Figure 43:
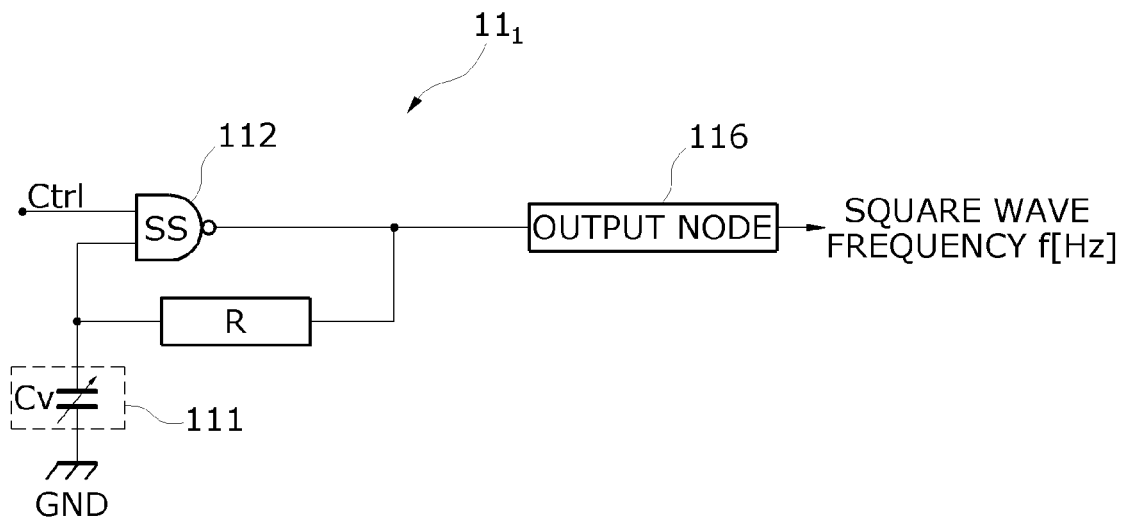

Referring to FIG. 43, the unit cell $11_1$ includes an ID generation element 111, a Schmitt triggered NAND gate 112, a resistor R, and an output node 116.

Also, the ID generation element 111 may be one of the ID generation element A and the ID generation element B, which have been described with reference to FIGS. 34 and 38, respectively. The unit cell $11_1$ operates as an oscillation circuit and outputs a square wave frequency f [Hz] of 1/(2.2RCv) through the output node 116.

In FIG. 43, Cv indicates a capacitance of the ID generation element 111.

The square wave frequency output from the unit cell $11_1$ may be sampled at a desired time, and then may be used to generate a fixed binary digital value and be used as a clock essential for driving a digital circuit.

In this case, the ID generation element A may be implemented such that a capacitance between the first via and the hollow metal quadrangular pocket shape M2 & VIA2-1 & M1 & VIA2-1 & M2 composed of the first lower electrode (metal layer) M2, the second via VIA2-1, the third lower electrode (metal layer) M2, the third via, and the second lower electrode has a different value for each of the ID generation elements 111 of the N unit cells $11_1$ to $11_N$. Also, the ID generation element B may be implemented such that a capacitance between the first via and the hollow metal quadrangular pocket shape M2 & VIA2-1 & M2 composed of the first lower electrode (metal layer) M2, the second via VIA2-1, and the second lower electrode has a different value for each of the ID generation elements 111 of the N unit cells $11_1$ to $11_N$.

The capacitance between the first via and the hollow metal quadrangular pocket shape M2 & VIA2-1 & M1 & VIA2-1 & M2 composed of the first lower electrode (metal layer) M2, the second via VIA2-1, the third lower electrode (metal layer) M2, the third via, and the second lower electrode, which is for the ID generation element A, and the capacitance between the first via and the hollow metal quadrangular pocket shape M2 & VIA2-1 & M2 composed of the first lower electrode (metal layer) M2, the second via VIA2-1, and the second lower electrode, which is for the ID generation element B, are determined using Equation 1.

$$C=\varepsilon *A/t \quad \text{[Equation 1]}$$

Here, for the ID generation element A, ε indicates permittivity of an insulating film material between the first via and the hollow metal quadrangular pocket shape M2 & VIA2-1 & M1 & VIA2-1 & M2 composed of the first lower electrode (metal layer) M2, the second via VIA2-1, the third lower electrode (metal layer) M2, the third via, and the second lower electrode.

Also, for the ID generation element B, c indicates permittivity of an insulating film material between the first via and the hollow metal quadrangular pocket shape M2 & VIA2-1 & M2 composed of the first lower electrode (metal layer) M2, the second via VIA2-1, and the second lower electrode.

Also, for the ID generation element A, A indicates an area in which the first via faces the hollow metal quadrangular pocket shape M2 & VIA2-1 & M1 & VIA2-1 & M2 composed of the first lower electrode (metal layer) M2, the second via VIA2-1, the third lower electrode (metal layer) M2, the third via, and the second lower electrode, as expressed in a dotted line of FIG. 34.

Also, for the ID generation element B, A indicates an area in which the first via faces the hollow metal quadrangular pocket shape M2 & VIA2-1 & M2 composed of the first lower electrode (metal layer) M2, the second via VIA2-1, and the second lower electrode, as expressed in a dotted line of FIG. 39.

Also, t indicates an interval between the first via and the hollow metal quadrangular pocket shape.

As described above, the width of an etching hole in which the first via is to be formed, the thickness or material of the insulating film, the time or temperature of the etching process, etc. may act as variables during the semiconductor etching process. The variables may act during the process to randomly determine the capacitance.

Accordingly, by appropriately adjusting and controlling the variables, a different capacitance may be implemented for each of the ID generation elements 111 of the N unit cells $11_1$ to $11_N$.

Also, in order to check the capacitances of the N unit cells $11_1$ to $11_N$, a semiconductor chip may be produced through the MPW process, and a capacitance may be measured for each ID generation element of the produced semiconductor chip.

Figure 44:
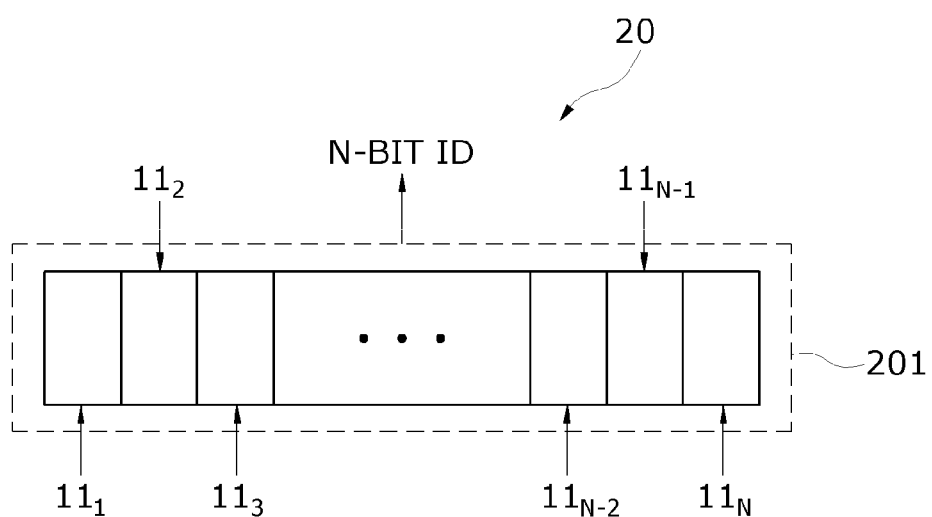
FIGS. 44 and 45 are views showing an embodiment of an ID fetch unit of the self-destructible apparatus according to the present invention.

FIG. 44 is a diagram showing an ID fetch unit according to an embodiment of the present invention, and an ID fetch unit 20 includes an input/output unit 201.

Also, the input/output unit 201 receives a binary digital value output from each of the plurality of unit cells $11_1$ to $11_N$ of the ID generation unit 10 and outputs an N-bit ID.

In this case, the plurality of unit cells $11_1$ to $11_N$ may have the same configuration as the unit cell shown in FIG. 41 or may also have the same configuration as the unit cell shown in FIG. 42. Or the plurality of unit cells $11_1$ to $11_N$ may be composed of such unit cells shown in FIG. 41 and such unit cells shown in FIG. 42.

When the plurality of unit cells $11_1$ to $11_N$ are configured as shown in FIG. 43, the ID fetch unit 200 should sample a square wave frequency output from each of the plurality of unit cells $11_1$ to $11_N$ in order to generate the N-bit ID.

Also, when the plurality of unit cells $11_1$ to $11_N$ are configured as shown in FIG. 43, the ID fetch unit 20 will be described with reference to FIG. 45.

FIG. 45 is a diagram showing an ID fetch unit according to another embodiment of the present invention, and the ID fetch unit 600 includes a sampling unit 610 and an output unit 620.

Also, the sampling unit 610 includes a plurality of D flip-flops that receive square wave frequencies $f_1$ to $f_N$ output from the plurality of unit cells $11_1$ to $11_N$.

Here, each of the plurality of D flip-flops has an input terminal D, an output terminal Q, and a clock terminal CLK. When a clock signal SCLK is applied to the clock terminal CLK, each D flip-flop outputs 1 through the output terminal Q when an input signal input to the input terminal D is 1, and outputs 0 through the output terminal Q when the input signal input to the input terminal D is 0.

Also, when the clock signal SCLK is input to the clock terminal CLK at a desired sampling time, the plurality of D flip-flops output, to the output unit 620 through the output terminal Q, a binary digital value corresponding to one of the square wave frequencies $f_1$ to $f_N$ output from the plurality of unit cells $11_1$ to $11_N$ at that time.

Also, the output unit 620 receives binary digital values output from the plurality of D flip-flops and outputs an N-bit ID.

Figure 46:
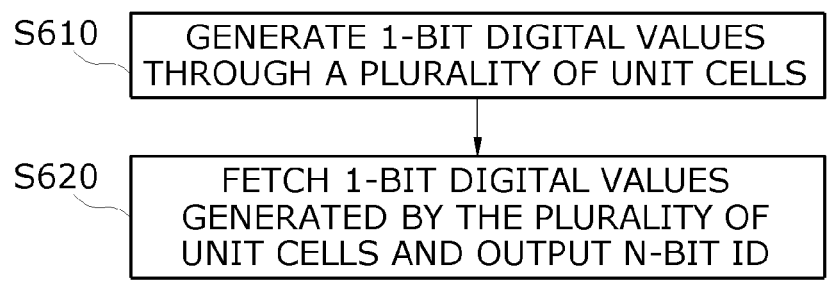
FIG. 46 is a flowchart illustrating a digital value generation method for the self-destructible apparatus according to the present invention.

FIG. 46 is a flowchart showing a digital value generation method according to an embodiment of the present invention. The digital value generation method includes generating a 1-bit digital value by each of the plurality of unit cells (S610) and fetching the 1-bit digital value generated by each of the plurality of units cells and outputting an N-bit ID (S620).

In detail, a digital value generation apparatus 1 generates a 1-bit digital value by each of the plurality of unit cells $11_1$ to $11_N$ each including the above-described ID generation element, and then fetches the 1-bit digital value generated by each of the plurality of unit cells $11_1$ to $11_N$ and outputs an N-bit ID.

In this case, when the plurality of unit cells $11_1$ to $11_N$ are configured as shown in FIG. 43, the digital value generation apparatus 1 samples a square wave frequency output from each of the plurality of unit cells $11_1$ to $11_N$ and generates a 1-bit digital value corresponding to the frequency at the sampling time.

The self-destructible apparatus and method according to the present invention may form a cavity with a desired area at a desired position on a semiconductor die, and at the same time, may expose a plurality of facing pin-shaped metal layers or a plurality of stick-shaped metal layers which are already stacked in the cavity, by preparing a pad mask at a planned position where a metal pad is not disposed on the semiconductor die and then performing a dry (plasma) etching process. Also, the self-destructible apparatus and method may complete a cavity cell structure by filling the cavity with an ignitable or explosive material, sealing the filled cavity, and connecting a variable voltage/current supply unit capable of setting a preplanned voltage and current to the metal layer exposed in the cavity. When a variable voltage and current are applied to the variable voltage/current supply unit of the cavity cell formed through this process, the temperature of the ignitable or explosive material may increase, and also flames (sparks) may occur due to free discharge through the plurality of facing pin-shaped metal layers, so that the semiconductor die or chip may be burned out, destroyed, or exploded due to a reaction of the ignitable or explosive material. Thus, it is possible to stop functions of a circuit for data or operation embedded in the semiconductor or to destroy the chip.

Also, the self-destructible apparatus and method according to the present invention may implement a cavity cell in a semiconductor chip to activate a function capable of self-burnout, destruction, or explosion by the semiconductor itself, when a device equipped with the semiconductor is put under an uncontrollable condition or at a undesired specific location or under an undesired specific environment, or when a wireless control signal is transmitted to or received from a remote site. Thus, it is possible to prevent attack, hacking, and robbery against the data or control function embedded in the chip.

Also, with the self-destructible apparatus and method according to the present invention, it is possible to replace an electronic detonator used for bullets and bombs, which is composed of a plurality of components having a large volume, and thus has a limitation on miniaturization, with a miniaturized single semiconductor chip.

Also, the self-destructible apparatus and method according to the present invention configure a metal pattern to have coil characteristics by connecting horizontally arranged stick-shaped metal patterns in series to one another, apply a variable voltage/current to an ID generation element through a variable voltage/current supply unit, and apply a variable voltage/current pin-shaped metal patterns 1, 2, and 3 and 1', 2', and 3', so that the ignitable or explosive material contained in the cavity cell explodes, and thus an electron emission effect is generated due to an electromagnetic pulse effect (EMP). The electron emission effect affects and destroys not only the semiconductor chip including a self-destructible operation unit within the influence of electromagnetic pulses but also any nearby electronic devices.

Also, the self-destructible apparatus and method according to the present invention configure a digital physical unclonable function (PUF) ID generation unit and an ID matching unit and configure the variable voltage/current supply unit to apply a predetermined voltage and current to a cavity cell only when an PUF ID and an externally specified ID match each other, so that selectively identify, ignite, and explode only a cavity cell of a semiconductor that is specified in case of burnout, destruction, or explosion due to malfunction of the cavity cell.

The above description is merely illustrative of the technical spirit of the present disclosure. It will be apparent to those skilled in the art that various modifications and variations can be made in the present disclosure without departing from the essential characteristics thereof.

Therefore, the embodiments are to be construed as illustrative rather than restrictive, and the scope of the technical idea of the present disclosure is not limited by these embodiments. The scope of the invention should be construed by the appended claims, and all technical ideas within the scope of their equivalents should be construed as being included in the scope of the invention.

The invention claimed is:

1. A self-destructible apparatus comprising:
   a self-destructible operation unit comprising a plurality of cavity cells;
   a variable voltage/current supply unit configured to supply a variable voltage and current to the self-destructible operation unit;
   an identification (ID) matching unit configured to compare an ID input from an external source to a digital physical unclonable function (PUF) ID assigned to each of the cavity cells to determine whether the two IDs match each other so that power of the variable voltage/current supply unit is supplied to only a desired cavity cell among the plurality of cavity cells;
   a digital PUF ID generation unit configured to generate the digital PUF ID being input to the ID matching unit; and
   an external ID input unit configured to generate the ID being input to the ID matching unit.

2. The self-destructible apparatus of claim 1, wherein the self-destructible operation unit comprises:
   a first insulating layer formed over a substrate;
   a first metal layer of facing pin-shaped metal patterns and a stick-shaped metal pattern, the first metal layer being formed over the first insulating layer;
   a second insulating layer formed over the first metal layer;
   a second metal layer of facing pin-shaped metal patterns and a stick-shaped metal pattern, the second metal layer being formed over the second insulating layer;
   a third insulating layer formed over the second metal layer;
   a third metal layer of facing pin-shaped metal patterns and a stick-shaped metal pattern, the third metal layer being formed over the third insulating layer;
   a fourth insulating layer formed over the third metal layer;
   a fourth metal layer of facing pin-shaped metal patterns and a stick-shaped metal pattern, the fourth metal layer being formed over the fourth insulating layer;
   a pair of conductive interlayer vias configured to connect pin-shaped metal patterns at one ends among the facing pin-shaped metal patterns formed in the first metal layer, the second metal layer, the third metal layer, and the fourth metal layer in parallel to one another and configured to connect pin-shaped metal patterns at other ends among the facing pin-shaped metal patterns in parallel to one another;
   a conductive interlayer via configured to connect the stick-shaped metal patterns formed in the first metal layer, the second metal layer, the third metal layer, and the fourth metal layer in series to one another;
   a fifth insulating layer formed over the fourth metal layer and the fourth insulating layer;
   a plurality of cavities formed in the first insulating layer, the second insulating layer, the third insulating layer, the fourth insulating layer, and the fifth insulating layer through a dry (plasma) etching process; and
   a digital PUF ID generation unit having a self-destructible operation unit configured to inject an ignitable or explosive material into the plurality of cavities and seal the cavities with a film or glass.

3. The self-destructible apparatus of claim 2, wherein the facing pin-shaped metal patterns of the metal layers each have one end portion formed to be horizontal or curved, the end portion having any one of a triangular shape, an arrowhead shape, and a pointed shape.

4. The self-destructible apparatus of claim 2, wherein the insulating layers and the metal layers of the self-destructible operation unit are arranged in a horizontal direction.

5. The self-destructible apparatus of claim 1, wherein the self-destructible operation unit comprises:
   a first insulating layer formed over a substrate;
   a first metal layer of facing pin-shaped metal patterns and a stick-shaped metal pattern, the first metal layer being formed over the first insulating layer;
   a second insulating layer formed over the first metal layer;
   a second metal layer of facing pin-shaped metal patterns and a stick-shaped metal pattern, the second metal layer being formed over the second insulating layer;

a third insulating layer formed over the second metal layer;

a third metal layer of facing pin-shaped metal patterns and a stick-shaped metal pattern, the third metal layer being formed over the third insulating layer;

a fourth insulating layer formed over the third metal layer;

a fourth metal layer of facing pin-shaped metal patterns and a stick-shaped metal pattern, the fourth metal layer being formed over the fourth insulating layer;

a pair of conductive interlayer vias configured to select some of pin-shaped metal patterns at one ends from among the facing pin-shaped metal patterns formed in the first metal layer, the second metal layer, the third metal layer, and the fourth metal layer and connect the selected pin-shaped metal patterns in parallel to one another and configured to select some of pin-shaped metal patterns at other ends from among the facing pin-shaped metal patterns and connect the selected pin-shaped metal patterns in parallel to one another;

a pin-shaped metal pattern configured to connect pin-shaped metal patterns that are not connected to the conductive interlayer vias among the facing pin-shaped metal patterns formed in the first metal layer, the second metal layer, the third metal layer, and the fourth metal layer to a circuit connection metal layer of a semiconductor function block;

a conductive interlayer via configured to select some of the stick-shaped metal patterns formed in the first metal layer, the second metal layer, the third metal layer, and the fourth metal layer and connect the selected stick-shaped metal patterns in series to one another;

a stick-shaped metal pattern configured to connect stick-shaped metal patterns that are not connected to the conductive interlayer via among the stick-shaped metal patterns formed in the first metal layer, the second metal layer, the third metal layer, and the fourth metal layer to a circuit connection metal layer of a semiconductor function block;

a fifth insulating layer formed over the fourth metal layer;

a plurality of cavities formed in the first insulating layer, the second insulating layer, the third insulating layer, the fourth insulating layer, and the fifth insulating layer through a dry (plasma) etching process; and a digital PUF ID generation unit having a self-destructible operation unit configured to inject an ignitable or explosive material into the plurality of cavities and seal the cavities with a film or glass.

6. The self-destructible apparatus of claim 1, wherein the self-destructible operation unit comprises:

a first insulating layer formed over a substrate;

a first metal layer of "⊓"-shaped metal patterns formed over the first insulating layer and arranged at regular intervals;

a second insulating layer formed over the first metal layer;

a plurality of second vias formed over the second insulating layer and formed to connect the first metal layer;

a plurality of second metal layers formed over the second vias;

a second metal layer of a plurality of facing pin-shaped metal patterns formed over the second insulating layer and arranged at regular intervals;

a third insulating layer formed over the second metal layer;

a plurality of third vias formed over the third insulating layer and formed to connect the second metal layer;

a third metal layer of a plurality of "I"-shaped metal patterns formed over the third vias and arranged at regular intervals;

a fourth insulating layer formed over the third metal layer;

a pair of coplanar metal patterns configured to select some of pin-shaped metal patterns at one ends or other ends from among the plurality of facing pin-shaped metal patterns formed on the second metal layer and arranged at regular intervals and to connect the selected pin-shaped metal patterns in parallel to one another;

a fifth insulating layer formed over the fourth insulating layer;

a plurality of cavities formed in the first insulating layer, the second insulating layer, the third insulating layer, the fourth insulating layer, and the fifth insulating layer through a dry (plasma) etching process; and a digital PUF ID generation unit having a self-destructible operation unit configured to inject an ignitable or explosive material into the plurality of cavities and seal the cavities with a film or glass.

7. The self-destructible apparatus of claim 1, wherein the digital PUF ID generation unit comprises:

an ID generation unit including a plurality of unit cells; and an ID fetch unit configured to output a multi-bit ID using output values of the plurality of unit cells.

8. The self-destructible apparatus of claim 7, wherein each of the plurality of unit cells comprises an ID generation element including a first upper electrode and a third lower electrode formed in different layers, wherein the output values are determined depending on an electrical connection or disconnection between the first upper electrode and the third lower electrode, and wherein the electrical connection or disconnection is determined by a difference in length of a first via formed under the first upper electrode.

9. The self-destructible apparatus of claim 7, wherein an ID generation element comprises:

a first insulating film formed over a substrate;

a third lower electrode formed over the first insulating film;

a second insulating film formed over the third lower electrode;

a second via hole formed under the second insulating film through an etching process and a third via hole formed under a first lower electrode through an etching process;

second and third vias formed coplanar by filling the second and third via holes with a conductor, respectively;

the first lower electrode and a second lower electrode formed coplanar over the second via and the third via;

a third insulating film formed over the first lower electrode and the second lower electrode;

a first via hole formed under the third insulating film through an etching process;

a first via formed by filling the first via hole with a conductor; and a first upper electrode formed over the first via.

10. The self-destructible apparatus of claim 9, wherein the first via hole is formed at different depths through a change in the etching process.

11. The self-destructible apparatus of claim 9, wherein when the first via reaches the first lower electrode, the second lower electrode, the second via, the third via, or the third lower electrode, the first upper electrode and the third lower electrode are electrically connected to each other, and wherein when the first via does not reach the first lower electrode, the second lower electrode, the second via, the third via, and the third lower electrode, the first upper electrode and third lower electrode are electrically disconnected from each other.

12. The self-destructible apparatus of claim 7,
wherein some of the plurality of unit cells comprise an ID generation element in which a first upper electrode is electrically connected to the first lower electrode, a second lower electrode, a second via, a third via, or a third lower electrode, and
wherein the others of the plurality of unit cells comprise an ID generation element in which the first upper electrode is electrically disconnected from the first lower electrode, the second lower electrode, the second via, the third via, and the third lower electrode.

13. The self-destructible apparatus of claim 7, wherein each of the plurality of unit cells comprises:
a first voltage source configured to supply a first voltage;
an ID generation element connected between the first voltage source and a second voltage source configured to supply a second voltage lower than the first voltage; and
an output node configured to output 0 or 1 as the output value depending on an electrical connection or disconnection of the ID generation element.

14. The self-destructible apparatus of claim 13,
wherein each of the plurality of unit cells further comprises a resistor connected between the second voltage source and the ID generation element, and
wherein a first upper electrode is connected to the first voltage source, a third lower electrode is connected to the resistor, and the output node is connected to the third lower electrode.

15. The self-destructible apparatus of claim 13,
wherein each of the plurality of unit cells further comprises a resistor connected between the first voltage source and the ID generation element, and
wherein a first upper electrode is connected to the resistor, a third lower electrode is connected to the second voltage source, and the output node is connected to the first upper electrode.

16. The self-destructible apparatus of claim 13, wherein each of the plurality of unit cells comprises an oscillation circuit configured to output a square wave frequency as the output value by using the ID generation element as a capacitor.

17. The self-destructible apparatus of claim 7, wherein the ID fetch unit comprises:
a sampling unit configured to sample a square wave frequency output from each of the plurality of unit cells and output a plurality of binary digital values; and
an output unit configured to output the multi-bit ID by using the plurality of binary digital values.

18. The self-destructible apparatus of claim 17, wherein the sampling unit comprises a plurality of D flip-flops configured to receive square wave frequencies output from the plurality of unit cells and output 0 or 1 by using a square wave frequency when a clock signal is applied.

19. The self-destructible apparatus of claim 17, wherein the ID generation elements of the plurality of unit cells have first vias with different depths.

20. The self-destructible apparatus of claim 1, wherein the self-destructible operation unit is identified and operated using an unclonable digital ID with an ignitable or explosive material.

21. The self-destructible apparatus of claim 1, wherein the variable voltage/current supply unit applies a desired current using a current mirror.

22. The self-destructible apparatus of claim 1, wherein the variable voltage/current supply unit applies a desired voltage using a voltage multiplier.

23. A self-destructible method comprising:
forming a self-destructible operation unit comprising a plurality of cavity cells;
installing a variable voltage/current supply unit configured to supply a variable voltage and current to the self-destructible operation unit;
inputting identifications (IDs) to an ID matching unit through an external ID input unit and a digital physical unclonable function (PUF) ID generation unit; and
comparing an ID input from an external source and a digital PUF ID assigned to each of the cavity cells by the ID matching unit and supplying power of the variable voltage/current supply unit to only a desired cavity cell among the plurality of cavity cells of the self-destructible operation unit depending on whether the two IDs match each other to perform self-destruction.

24. The self-destructible method of claim 23, wherein the digital PUF ID generation unit comprises:
generating a plurality of output values using a plurality of unit cells each including an ID generation element; and
outputting a multi-bit ID using the plurality of output values.

25. The self-destructible method of claim 24, wherein the ID generation element comprises:
a first insulating film formed over a substrate;
a third lower electrode formed over the first insulating film;
a second insulating film formed over the third lower electrode;
a second via hole and a third via hole formed coplanar under the second insulating film through an etching process;
a second via and a third via formed by filling the second via hole and the third via hole with a conductor, respectively;
a first lower electrode and a second lower electrode formed coplanar over the second via and the third via;
a third insulating film formed over the first lower electrode and the second lower electrode;
a first via hole formed under the third insulating film at different depths through an etching process;
a first via formed by filling the first via hole with a conductor; and
a first upper electrode formed over the first via.

26. The self-destructible method of claim 24,
wherein the generating comprises generating 0 or 1 as the output value depending on whether a first upper electrode is electrically connected to or disconnected from a first lower electrode, a second via, a second lower electrode, or a third via through a first via, and
wherein a first via hole is formed at different depths through an etching process.

27. The self-destructible method of claim 24, wherein the generating comprises generating a square wave frequency as the output value by using the ID generation element as a capacitor.

28. The self-destructible method of claim 24,
wherein the outputting comprises:
sampling a square wave frequency output from each of the plurality of unit cells at a desired time to generate a plurality of binary digital values; and
outputting the multi-bit ID by using the plurality of binary digital values, and
wherein a first via hole is formed in different depths and widths through an etching process.

29. The self-destructible method of claim 24, wherein the ID generation element comprises:
a first insulating film formed over a substrate;
a third lower electrode formed over the first insulating film;
a second insulating film formed over the third lower electrode;
a second via hole formed under the second insulating film through an etching process;
a second via formed coplanar by filling the second via hole with a conductor;
a first lower electrode and a second lower electrode formed coplanar over the second via;
a third insulating film formed over the first lower electrode and the second lower electrode;
a first via hole formed under the third insulating film through an etching process;
a first via formed by filling the first via hole with a conductor; and
a first upper electrode formed over the first via.

30. The self-destructible method of claim 29, wherein the first via hole is formed at different depths through a change in the etching process.

31. The self-destructible method of claim 30,
wherein when the first via reaches the first lower electrode, the second lower electrode, or the second via, the first upper electrode and the third lower electrode are electrically connected to each other, and
wherein when the first via does not reach the first lower electrode, the second lower electrode, and the second via, the first upper electrode and the third lower electrode are electrically disconnected from each other.

32. The self-destructible method of claim 24,
wherein some of the plurality of unit cells comprise an ID generation element in which a first upper electrode is electrically connected to a first lower electrode, a second lower electrode, a second via, or a third lower electrode, and
wherein the others of the plurality of unit cells comprise an ID generation element in which the first upper electrode is electrically disconnected from the first lower electrode, the second lower electrode, the second via, the third via, and the third lower electrode.

33. The self-destructible method of claim 24, wherein each of the plurality of unit cells comprises:
the ID generation element, which is connected between a first voltage source configured to supply a first voltage and a second voltage source configured to supply a second voltage lower than the first voltage; and
an output node configured to output 0 or 1 as the output value depending on an electrical connection or disconnection of the ID generation element.

34. The self-destructible method of claim 24,
wherein each of the plurality of unit cells further comprises a resistor connected between a second voltage source and the ID generation element, and wherein a first upper electrode is connected to the first voltage source, the third lower electrode is connected to the resistor, and the output node is connected to the third lower electrode.

35. The self-destructible method of claim 24,
wherein each of the plurality of unit cells further comprises a resistor connected between the first voltage source and the ID generation element, and
wherein the first upper electrode is connected to the resistor, the third lower electrode is connected to the second voltage source, and the output node is connected to the first upper electrode.

36. The self-destructible method of claim 35, wherein at least some of the ID generation elements of the plurality of unit cells have first vias with different depths.

37. The self-destructible method of claim 23,
wherein the digital PUF ID generation unit comprises:
an ID generation unit including a plurality of unit cells; and
an ID fetch unit configured to output a multi-bit ID using output values of the plurality of unit cells,
wherein each of the plurality of unit cells comprises an ID generation element including a first upper electrode and a third lower electrode formed in different layers,
wherein the output values are determined depending on an electrical connection or disconnection between the first upper electrode and the third lower electrode, and
wherein the electrical connection or disconnection is determined by a difference in length of a first via formed under the first upper electrode through etching.

38. The self-destructible method of claim 37, wherein the ID fetch unit comprises:
a sampling unit configured to sample a square wave frequency output from each of the plurality of unit cells and output a plurality of binary digital values; and
an output unit configured to output the multi-bit ID by using the plurality of binary digital values.

39. The self-destructible method of claim 38, wherein the sampling unit comprises a plurality of D flip-flops configured to receive square wave frequencies output from the plurality of unit cells and output 0 or 1 by using a square wave frequency when a clock signal is applied.

40. The self-destructible method of claim 23,
wherein the digital PUF ID generation unit comprises:
outputting a plurality of output values using a plurality of units cells each including an ID generation element; and
outputting a multi-bit ID by using the plurality of output values, and
wherein the ID generation element comprises:
a first insulating film formed over a substrate;
a third lower electrode formed over the first insulating film;
a second insulating film formed over the third lower electrode;
a second via hole formed under the second insulating film through an etching process and a second via formed by filling the second via hole with a metal;
a first lower electrode and a second lower electrode formed coplanar over the second via;
a third insulating film formed over the first lower electrode and the second lower electrode;
a first via formed by filling, with a conductor, a first via hole formed under the third insulating film at different depths through an etching process; and
a first upper electrode formed over the first via.

41. The self-destructible method of claim 40,
wherein the generating comprises generating 0 or 1 as the output value depending on whether the first upper electrode is electrically connected to or disconnected from the first lower electrode, the second via, or the second lower electrode through the first via, and
wherein the first via hole is formed at different depths through the etching process.

42. The self-destructible method of claim 40, wherein the generating comprises generating a square wave frequency as the output value by using the ID generation element as a capacitor.

\* \* \* \* \*